(12) United States Patent
Buxton

(10) Patent No.: US 8,348,563 B2
(45) Date of Patent: Jan. 8, 2013

(54) COIL SUPPORT AND TRANSPORT SYSTEM AND PROCESS

(75) Inventor: William Buxton, Decatur, AL (US)

(73) Assignee: Nucor Corporation, Charlotte, NC (US)

( * ) Notice: Subject to any disclaimer, the term of this patent is extended or adjusted under 35 U.S.C. 154(b) by 0 days.

(21) Appl. No.: 12/891,186

(22) Filed: Sep. 27, 2010

(65) Prior Publication Data

US 2012/0076606 A1  Mar. 29, 2012

(51) Int. Cl.
*B60P 7/12* (2006.01)
(52) U.S. Cl. .......................................................... 410/50
(58) Field of Classification Search .................... 410/50, 410/119, 47, 48, 49; 53/473
See application file for complete search history.

(56) References Cited

U.S. PATENT DOCUMENTS

| | | | | |
|---|---|---|---|---|
| 3,481,627 A * | 12/1969 | Felburn | | 410/50 |
| 3,510,142 A * | 5/1970 | Erke | | 280/837 |
| 3,548,904 A | 12/1970 | Mackell | | |
| 3,769,763 A * | 11/1973 | Kwake | | 52/2.25 |
| 3,783,766 A * | 1/1974 | Boucher | | 52/2.23 |
| 4,102,274 A * | 7/1978 | Feary et al. | | 410/50 |
| 4,898,102 A | 2/1990 | Thebeau | | |
| 4,913,608 A * | 4/1990 | Royball | | 410/103 |
| 5,108,237 A * | 4/1992 | Zankich | | 410/21 |
| 5,211,518 A * | 5/1993 | Mimica | | 410/50 |
| 5,343,813 A | 9/1994 | Septer | | |
| 5,538,376 A | 7/1996 | Borda | | |
| 5,566,512 A * | 10/1996 | Page | | 52/2.16 |
| 5,647,708 A | 7/1997 | Letts, III | | |
| 5,833,413 A | 11/1998 | Cornelius | | |
| 5,836,605 A * | 11/1998 | Bowling | | 280/789 |
| 5,927,915 A * | 7/1999 | Grove, Sr. | | 410/49 |
| 5,944,349 A | 8/1999 | Bowling | | |
| 5,954,465 A | 9/1999 | Ellerbush | | |
| 6,065,796 A * | 5/2000 | Verduyn | | 296/100.12 |
| 6,231,284 B1 * | 5/2001 | Kordel | | 410/49 |
| 6,250,860 B1 | 6/2001 | Hornady | | |
| 6,457,921 B1 | 10/2002 | Freeman | | |
| 6,746,190 B2 | 6/2004 | Freeman | | |
| 6,923,608 B2 | 8/2005 | Rediehs | | |
| 7,004,080 B2 | 2/2006 | Creighton et al. | | |
| 7,131,805 B1 | 11/2006 | Morris | | |
| 7,270,507 B1 | 9/2007 | Jernigan | | |
| 8,025,468 B2 * | 9/2011 | Sever | | 410/47 |

* cited by examiner

*Primary Examiner* — H Gutman
(74) *Attorney, Agent, or Firm* — Moore & Van Allen PLLC; Jeffrey R. Gray

(57) ABSTRACT

Disclosed are embodiments for a system for securing a load to a platform such as a coil to a transport system. The system includes a frame adapted for placement on a platform. The frame includes a cradle structure for engaging the load. An inflatable bladder is placed over the load and connected to the frame. When tensioned and inflated with gas, the bladder applies force to the load to secure the load to the frame and prevent movement of the coil during transport.

33 Claims, 15 Drawing Sheets

COIL SUPPORT AND TRANSPORT SYSTEM AND PROCESS

FIELD

This invention relates generally to the field of support and transport of products, and more particularly embodiments of the invention relate to systems and methods for supporting and transporting coils or the like on various types of transport vehicles.

BACKGROUND

Securing coiled material for transport is generally difficult. For example, steel coils are processed at plants across the world and need to be ship to various locations across the world. The coils comprise steel that is formed into wires or sheets and is rolled into coil form into a cylindrical structure. The steel coils can typically weigh in the range of one-thousand (1,000) to over one-hundred thousand (100,000) pounds. The shear size, weight, and general shape of the coils make supporting and transporting them difficult. Since the coils are in a cylindrical form they are prone to rolling, and are otherwise difficult to handle during production, loading, and transport.

Typically the coils are loaded onto trucks, trains, boats, planes, and other vehicles ("transport systems") and shipped across the world. While in transit the steel coils are susceptible to breaking free of their supports and causing damage. The steel coils could come loose for any number of reasons, for example, to name a few, they may not have been properly secured to the tractor-trailer, the mechanisms for securing the coils fail without warning, inexperienced tractor trailer drivers or other drivers make driving mistakes, the highways, roadways, or bridges are in bad condition (i.e. pot holes, snow or ice covered, etc.).

Attempts to solve the problem rely on the driver's ability to secure the load to the vehicle. Typically, most states require that steel coil loads have one chain per ten thousand (10,000) lbs of coil. The chains are secured in various configurations around and through the eyeholes of the steel coils, which causes unequal loading if they are not properly set up, as well as damage and disfigurement to the steel coils themselves, causing damage to the product and increasing the chances of steel coils becoming unsecured during transport. However, despite the associated issues chain configurations are usually accepted in most transportation situations because of the relative low cost of using the chains over more robust and costly configurations.

Therefore, there is a need to develop apparatuses and methods that help improve the support and transportation of steel coils that result in improved safety of the configurations and reduction in the associated costs.

BRIEF SUMMARY

Embodiments of the present invention address the above needs and/or achieve other advantages by providing apparatuses (e.g., a system, and/or other device) and methods that provides for the safe and cost efficient support and transport of coils.

Coiled material is generally difficult to secure and transport on various vehicles due to the size, shape, and weight of the coils. The present invention provides systems and methods for securing loads to a transport platform, such as coils to a trailer of a transport vehicle. The systems and methods, in general, provide low cost, standardized, flexible support for coils without having to retrofit the current configuration of tractor-trailers and other vehicles already used for transport.

For example, in one embodiment, a system is provided for securing a load. The system comprises a frame and a cradle structure, where the cradle structure abuts the load. A bladder is adapted for coupling to the frame in a spaced apart position from the cradle structure. The bladder defines at least one chamber for receiving a gas, such that when the bladder is in a pressurized state, the bladder is capable of securing a load between the bladder and the cradle structure.

In one aspect, the bladder may further comprise a pneumatic inflation input operatively coupled to the at least one chamber of the bladder, wherein the pneumatic inflation input is adapted for coupling to a source of pressurized gas for filling the at least one chamber of the bladder with gas to thereby inflate the bladder.

In this aspect of the invention, the pneumatic inflation input of the bladder may be adapted for connection to an air break system of a transportation vehicle for inflation of the bladder.

In different aspects of the invention, the frame is one of a trailer, a train car, an aircraft platform, a platform on a ship, a platform of a building.

In another aspect of the invention the cradle is the frame.

In a second aspect of the invention, the frame comprises connectors for attaching the bladder to the frame, wherein one of the connectors comprises a winch.

In a third aspect of the invention, the cradle structure comprises first and second guides extending in a first direction and spaced apart from each other at a distance to abut opposed sides of the load.

In this third aspect of the invention, at least one of the first and second guides of the cradle structure may be contoured and/or beveled to abut a curved surface of the coil.

In this third aspect of the invention, at least one of the first and second guides of the cradle structure may be adjustable relative to the other guide to adjust the space between the guides.

In this third aspect of the invention, the cradle structure may further comprise third and fourth guides extending in a second direction and spaced apart from each other at a distance to abut opposed sides of the load. In some embodiments, at least one of the third and fourth guides of the cradle structure is adjustable relative to the other guide to adjust the space between the guides.

In a fourth aspect, the frame may further comprise first and second spaced apart opposed sides connected to third and fourth space apart opposed sides and a cradle structure comprising first and second guides extending between the first and second sides of the frame and located between the third and fourth sides of the frame. The guides of the cradle structure are spaced apart at a distance to support the load.

In this fourth aspect of the system, the first and second guides may be adjustable relative to each other to conform to a dimension of the load.

In a fifth aspect, frame may further comprise first and second spaced apart opposed sides connected to third and fourth space apart opposed sides and a cradle structure comprising third and fourth guides extending between the third and fourth sides of the frame and located between the first and second sides of the frame. The guides are spaced apart at a distance to support the load.

In this fifth aspect, the third and fourth guides are adjustable relative to each other to conform to a dimension of the load.

In a sixth aspect, the frame may comprise both first and second guides extending between the first and second sides of the frame and located between the third and fourth sides of the frame and third and fourth guides extending between the third and fourth sides of the frame and located between the first and second sides of the frame. Either one or both the first and second guides or third and fourth guides may be respectively adjustable to each other to conform to a dimension of the load.

In a seventh aspect, the bladder may comprise first and second spaced apart bladder sides, and wherein the frame further comprises first and second couplings positioned at respective opposed sides of the frame to thereby couple the first and second sides of the bladder to the frame.

In this seventh aspect, at least one of the first and second couplings of the frame comprises a winch adapted to adjust the bladder relative to the frame.

In this seventh aspect, the bladder may include at least one channel extending between the first and second bladder ends, wherein the channel is adapted for receiving at least one cable for securing said bladder to the first and second couplings of the frame.

In one aspect the at least one bladder chamber comprises two or more layers, wherein at least one layer can be pressurized.

In some embodiments, the load is a coil of material, such as coil of wires, steel plate, cabling, etc. In these embodiments, the cradle of the frame is configured to conform to the coil. For example, the cradle may include beveled first and second guides to act as chocks for the sides of the coil.

A bladder is disclosed for securing a load to a frame. In one embodiment, the bladder comprises an elongated body extending between opposed first and second ends. At least one bladder chamber is located in the body and is capable of being filled with pressurized gas. A pneumatic gas input is operatively coupled to the at least one bladder chamber and adapted for being coupled to a source of pressurized gas for supplying pressurized gas to the bladder. Securing means are associated with the body and adapted for securing the bladder to opposed couplings associated with the frame.

In one aspect of this embodiment, the bladder may comprise a plurality of bladder chambers.

In this aspect, the bladder may comprise a plurality of layers, wherein adjacent layers define a bladder chamber.

In one aspect the bladder chamber comprises two or more layers, wherein at least one layer can be pressurized.

In a second aspect, the bladder may comprise a cover at least partially surrounding the bladder chamber.

In a third aspect, the securing means comprises at least one channel formed in the body of the bladder extending between the first and second bladder ends, wherein the channel is adapted for receiving at least one cable for securing the bladder to the frame. Alternatively, the securing means may comprise respective straps connected to the first and second ends of the bladder for connecting the bladder to the frame.

The invention also relates to a process for securing a coil to a platform. The process comprises placing a frame on the platform, where the frame comprises a cradle structure for abutting the coil and placing a coil in the cradle structure of the frame. A bladder is placed adjacent to the coil, where the bladder comprises at least one chamber for receiving a gas. The bladder is coupled at opposed ends to opposed sides of the frame. Pressurized air is then applied to the bladder chamber to thereby secure the coil between the bladder and the cradle structure of the frame.

In one aspect, the bladder further comprises a pneumatic inflation input operatively coupled to the at least one chamber of the bladder, wherein the pneumatic inflation input is adapted for coupling to a source of pressurized gas. In a further aspect, the pneumatic inflation input of the bladder may be connected to an air break system of a transportation vehicle for inflation of the bladder.

In a second aspect, the frame comprises first and second spaced apart opposed sides connected to third and fourth space apart opposed sides, wherein the cradle structure is located within the frame and comprises first and second guides extending between the first and second sides of the frame and located between the third and fourth sides of the frame, where the guides are spaced apart at a distance to support the coil. In this aspect, the process further comprises adjusting the distance between the first and second guides of the cradle structure to conform to a dimension of the coil.

In a third aspect, the frame comprises first and second spaced apart opposed sides connected to third and fourth space apart opposed sides, wherein the cradle structure comprises third and fourth guides extending between the third and fourth sides of the frame and located between the first and second sides of the frame, wherein the guides are spaced apart at a distance to support the coil. In this aspect, the process further comprises adjusting the distance between the third and fourth guides of the cradle structure to conform to a dimension of the coil.

In a fourth aspect, the frame comprises first and second spaced apart opposed sides connected to third and fourth space apart opposed sides and the cradle structure comprises first and second guides extending between the first and second sides of the frame and located between the third and fourth sides of the frame, wherein said first and second guides are adjustable relative to each other and third and fourth guides extending between the third and fourth sides of the frame and located between the first and second sides of the frame, wherein the third and fourth guides are adjustable relative to each other. In this aspect, the process comprises adjusting the first and second guides of the cradle structure relative to each other and the third and fourth later guides of the cradle structure relative to each other to conform to dimensions of the coil.

In a fifth aspect, the process may further comprise winching at least one end of the bladder toward a side of the frame to thereby secure the coil to the frame.

In a sixth aspect, the bladder includes at least one bladder chamber and at least one channel extending between the first and second bladder ends, wherein the channel is adapted for receiving at least one cable. In this aspect, the process comprises inserting a cable in the channel of the bladder and securing opposed ends of the cable to the frame.

The features, functions, and advantages that have been discussed may be achieved independently in various embodiments of the present invention or may be combined in yet other embodiments, further details of which can be seen with reference to the following description and drawings.

BRIEF DESCRIPTION OF THE SEVERAL VIEWS OF THE DRAWINGS

Figure 1:
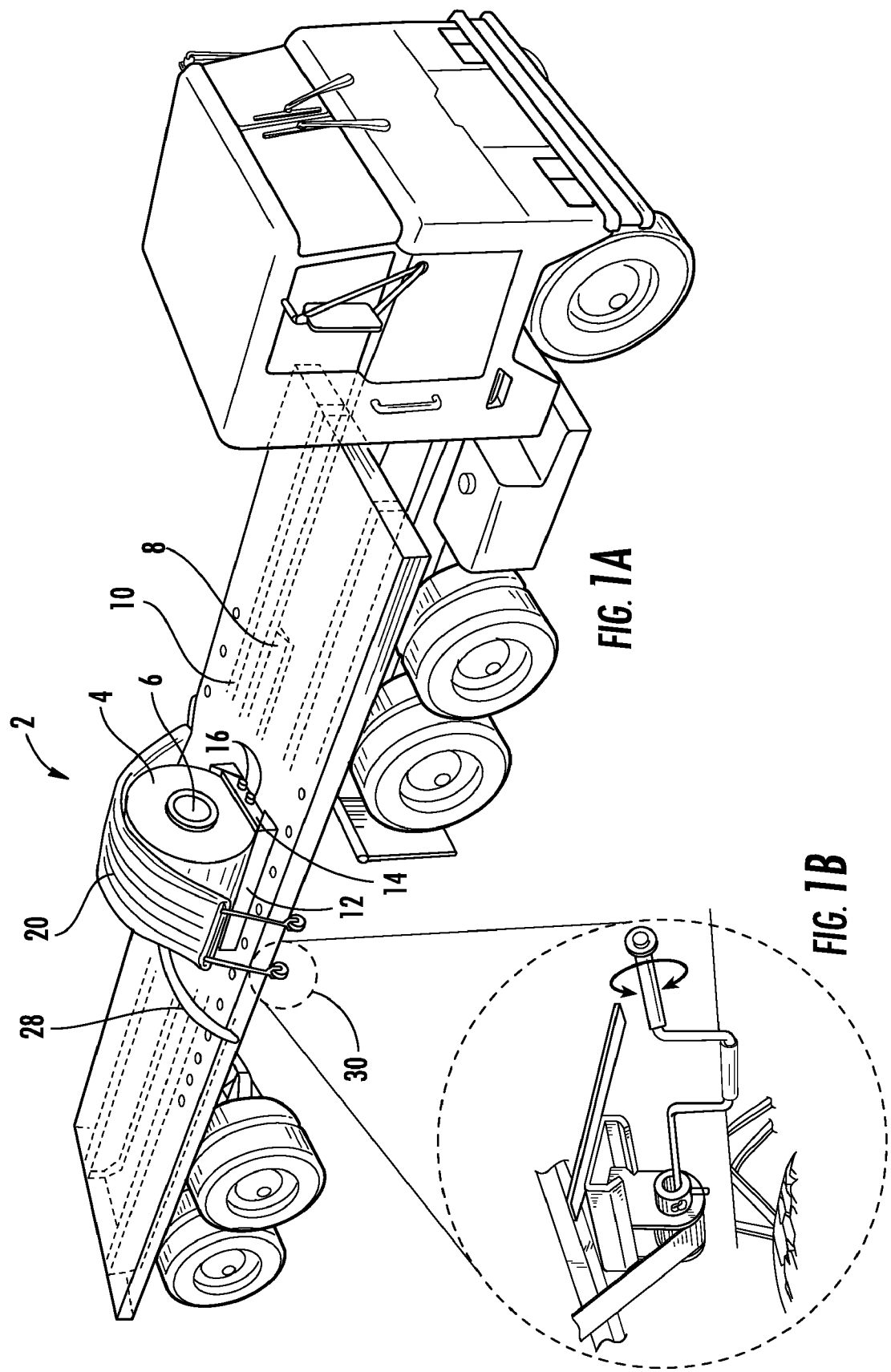
Figure 2:
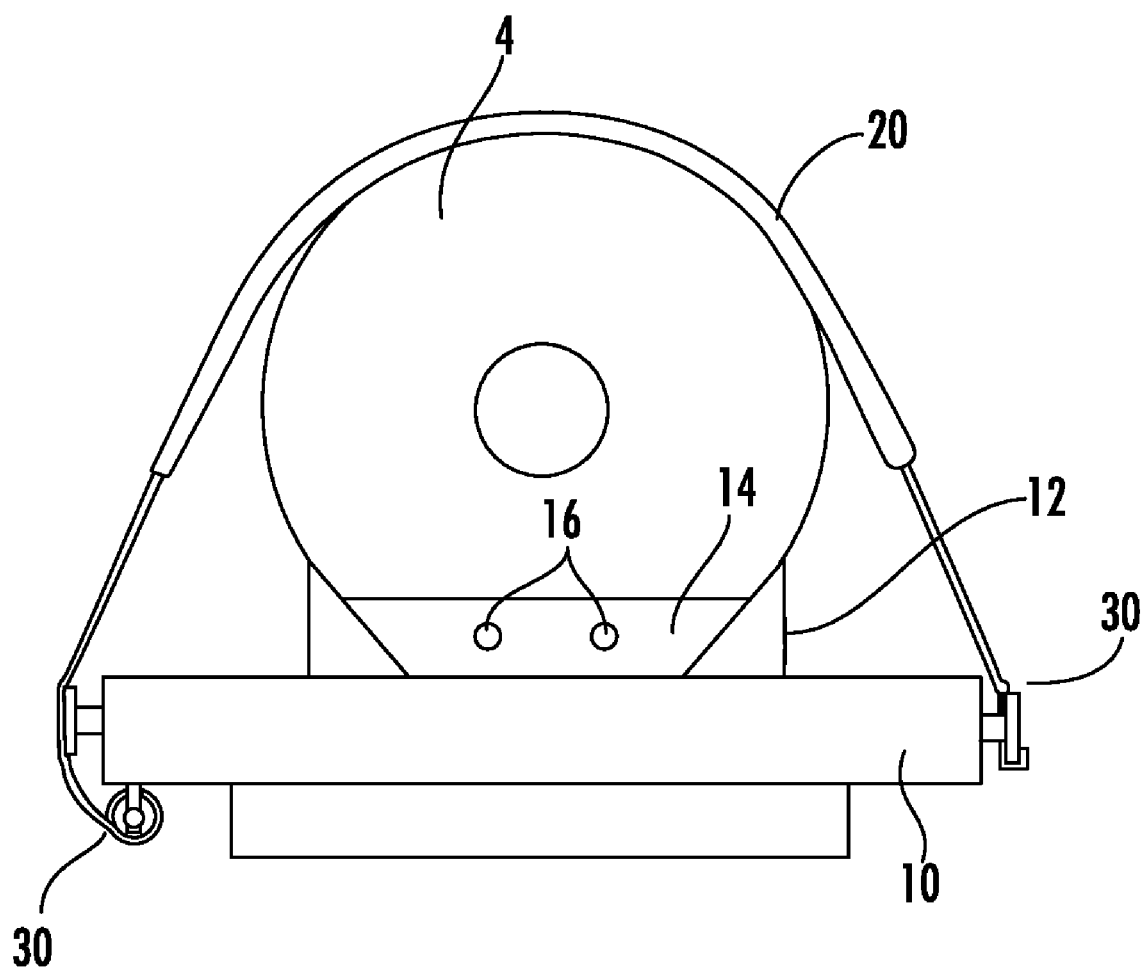
Figure 4:
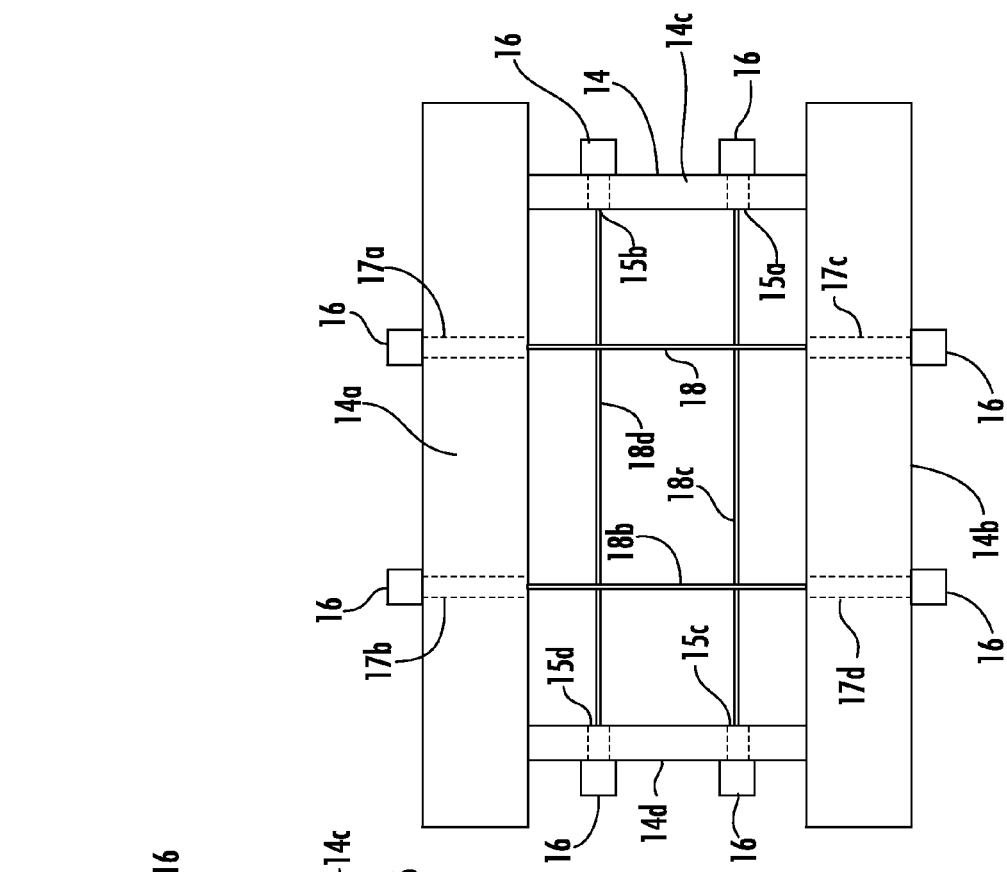
Figure 3:
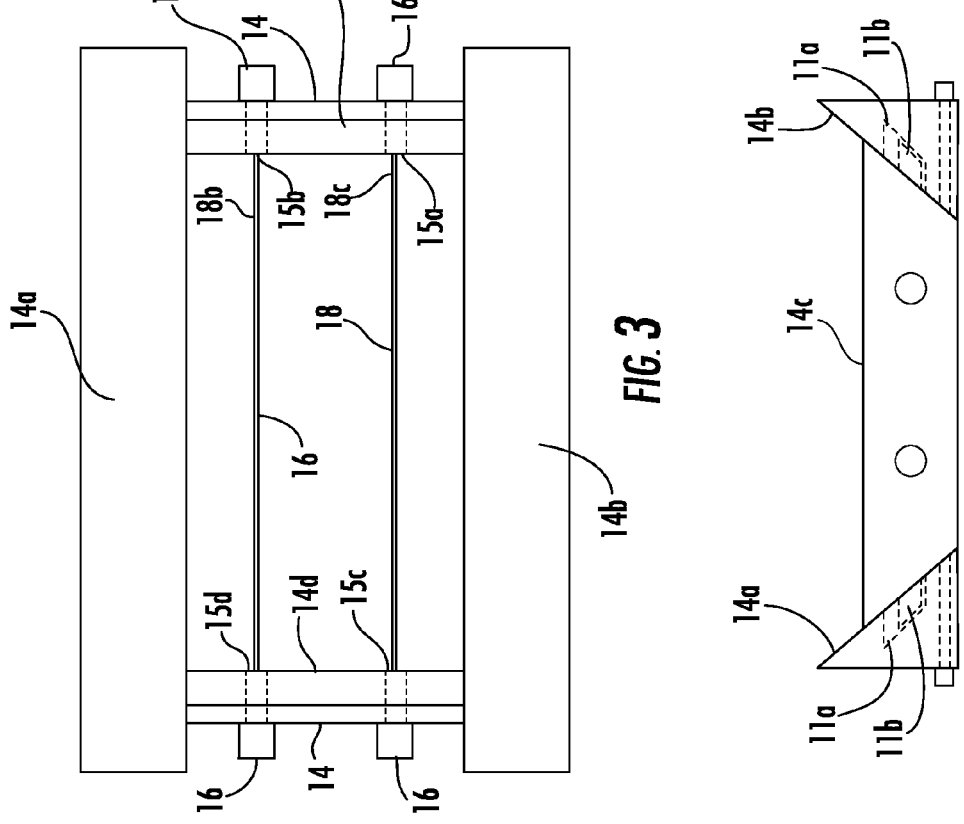

Having thus described embodiments of the invention in general terms, reference will now be made to the accompanying drawings, wherein:

FIG. 1A provides a perspective view illustrating a cradle coil support system on a frame of a tractor-trailer, in accordance with one embodiment of the present invention;

FIG. 1B provides a perspective view of a winch coupling on a frame of a tractor-trailer, in accordance with one embodiment of the present invention;

FIG. 2 provides a first side view of a cradle coil support system on a frame of the tractor-trailer illustrated in FIG. 1A, in accordance with one embodiment of the present invention;

FIG. 3 provides a bottom view of the cradle with two adjustable guides, in accordance with one embodiment of the present invention;

FIG. 4 provides a bottom view of the cradle with four adjustable guides, in accordance with one embodiment of the present invention.

Figure 5:
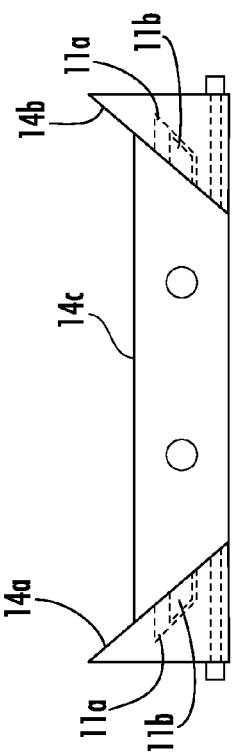

FIG. 5 provides a first side view of the cradle with adjustable guides that move vertically, in accordance with one embodiment of the present invention.

Figure 6:
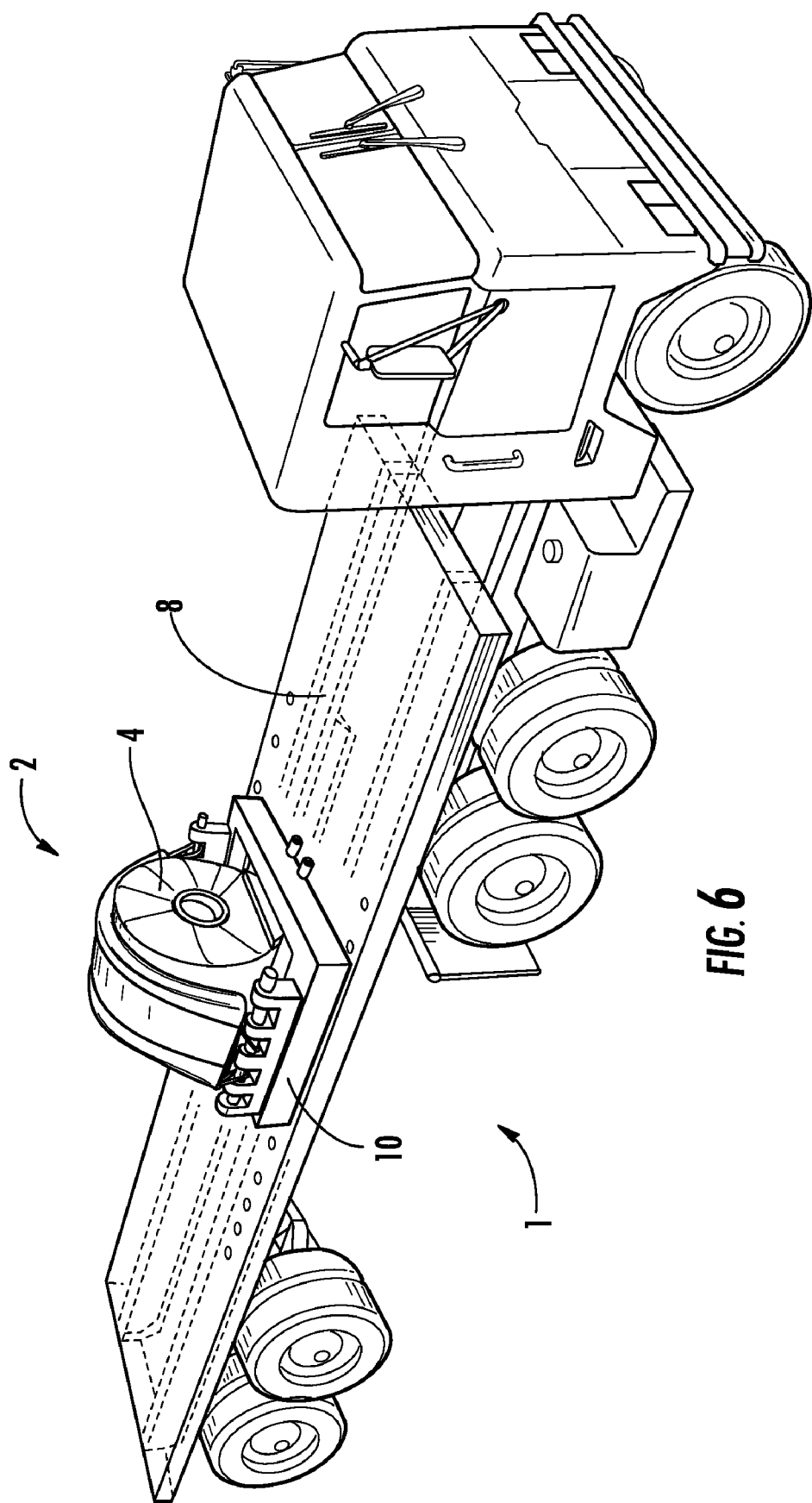
Figure 7:
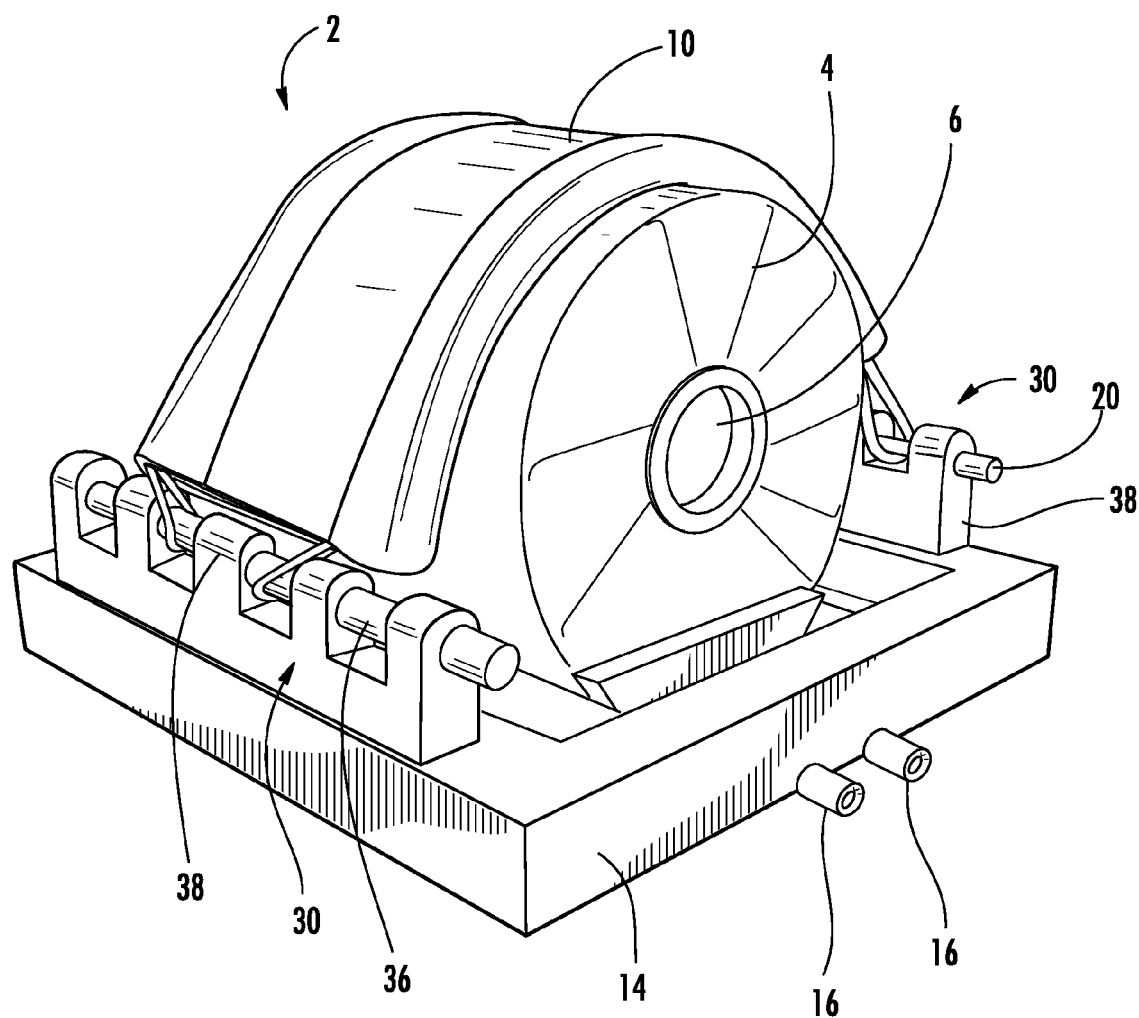
Figure 8:
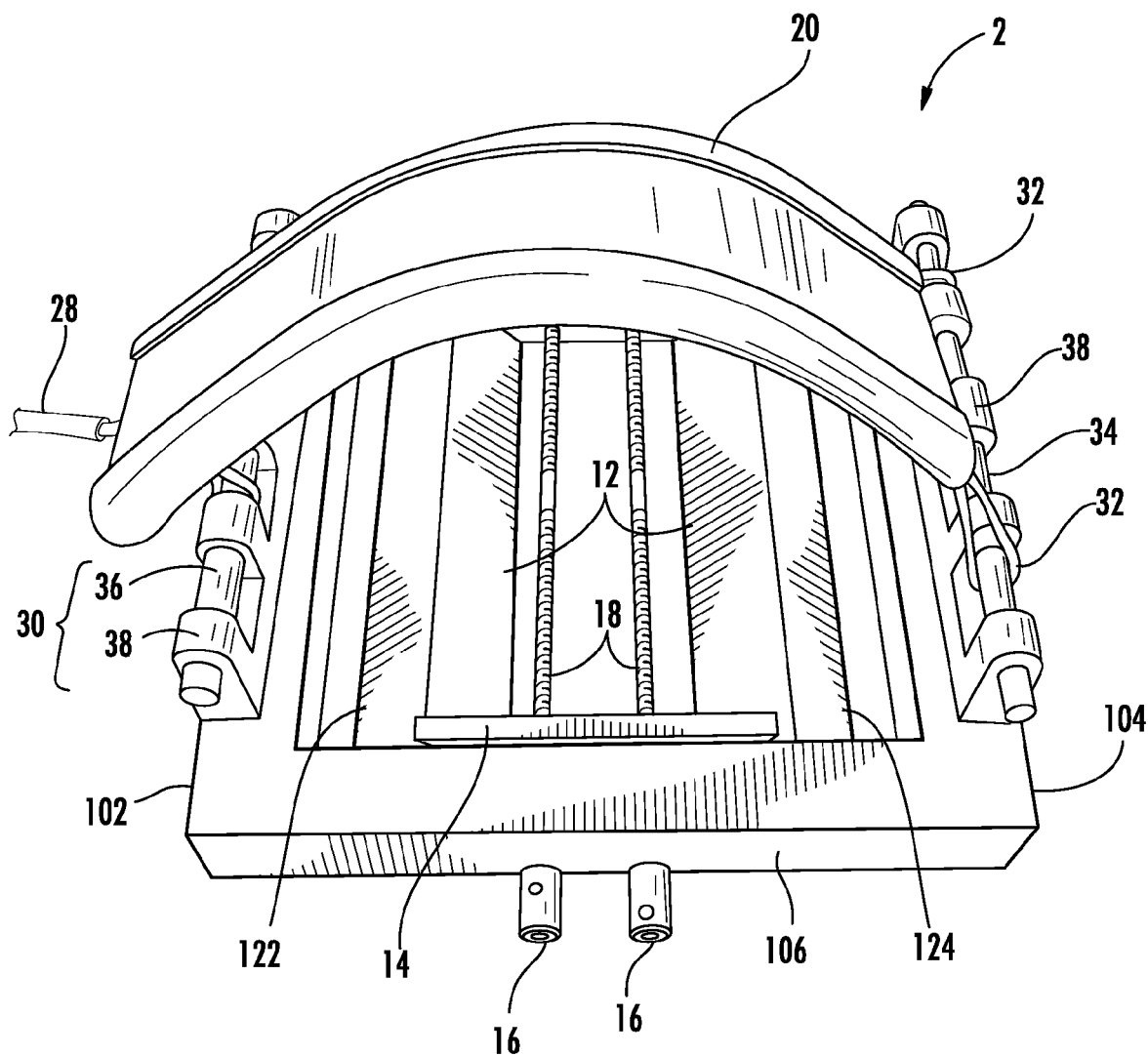
Figure 9:
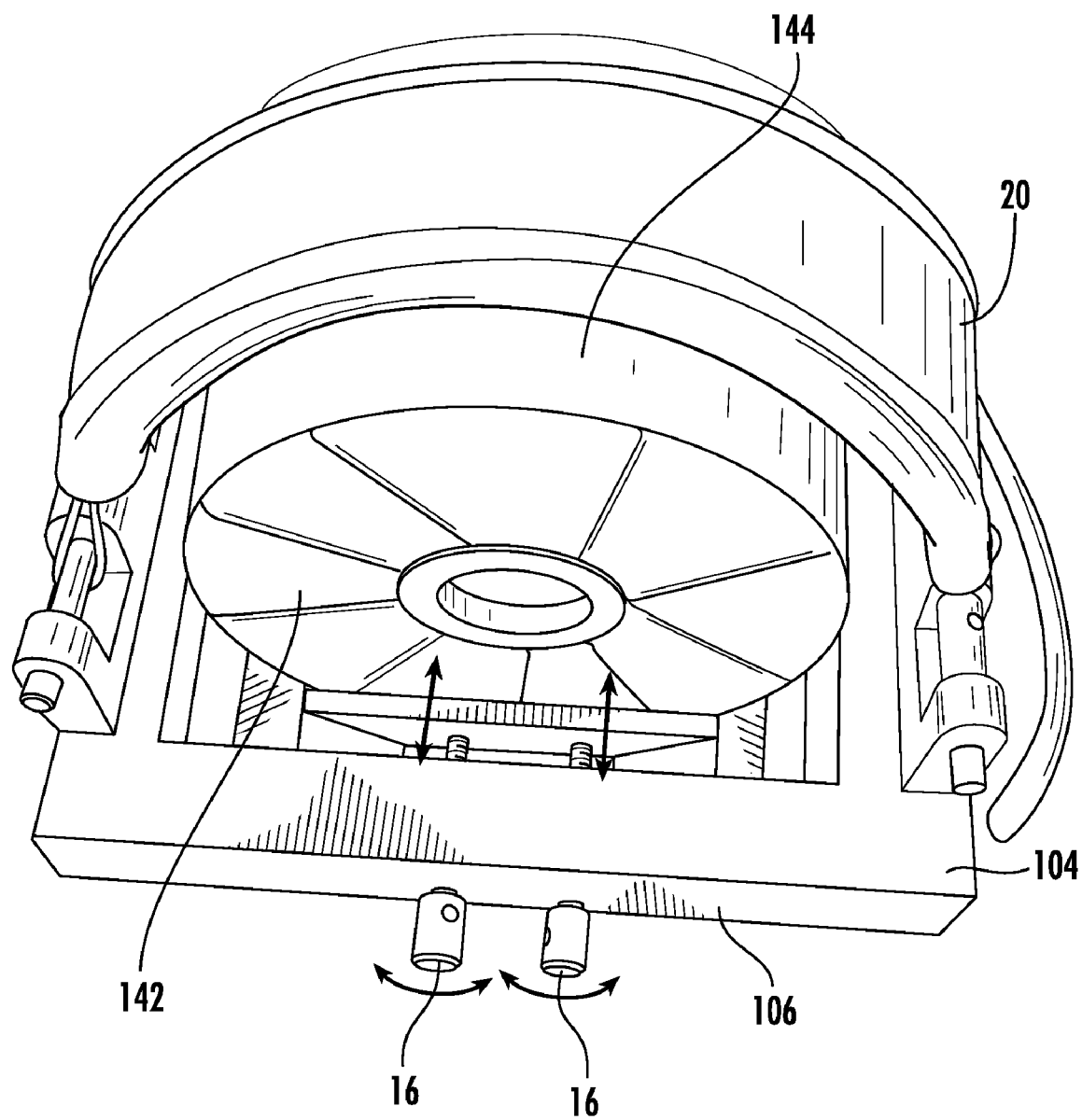
Figure 10:
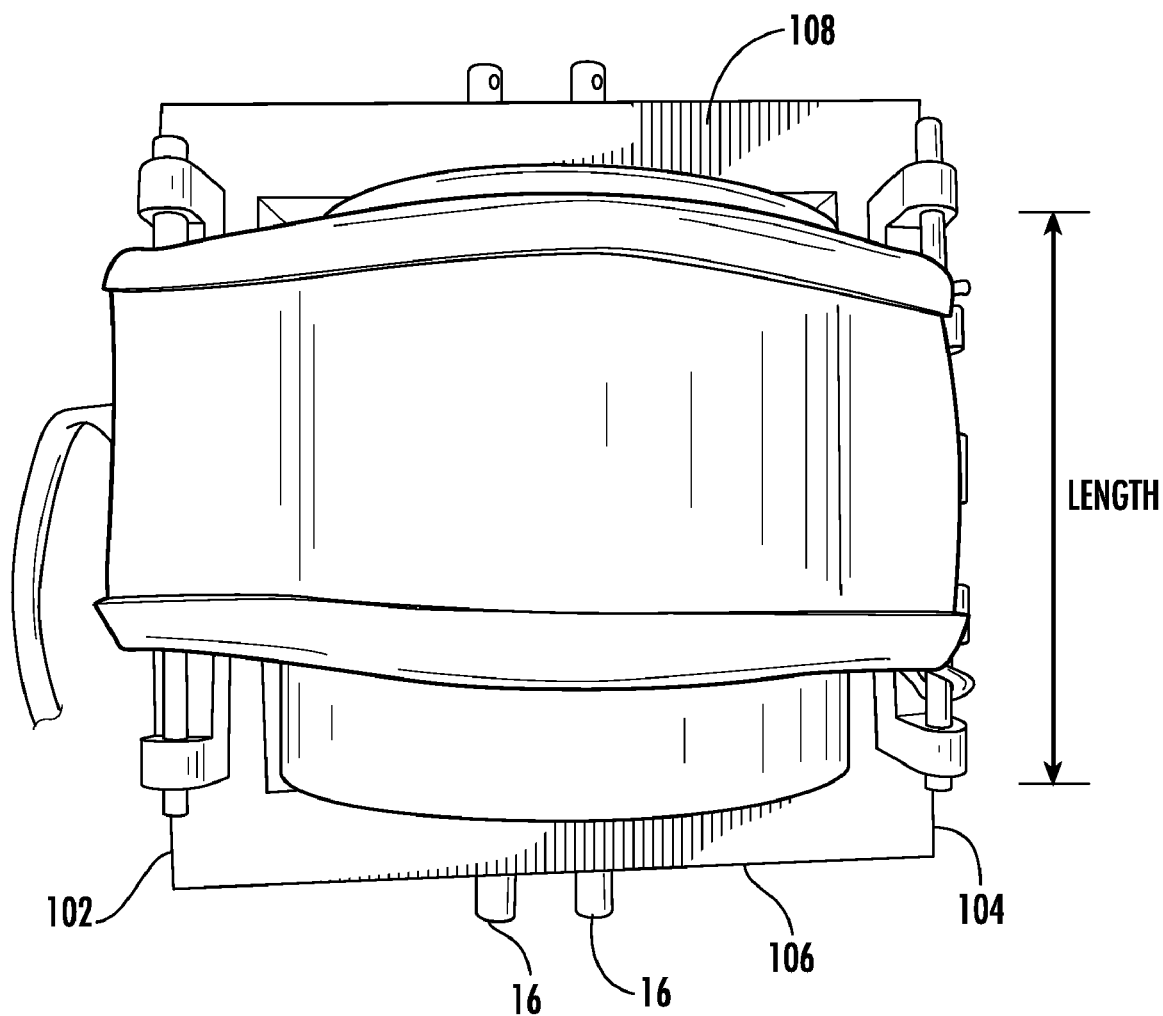
Figure 11:
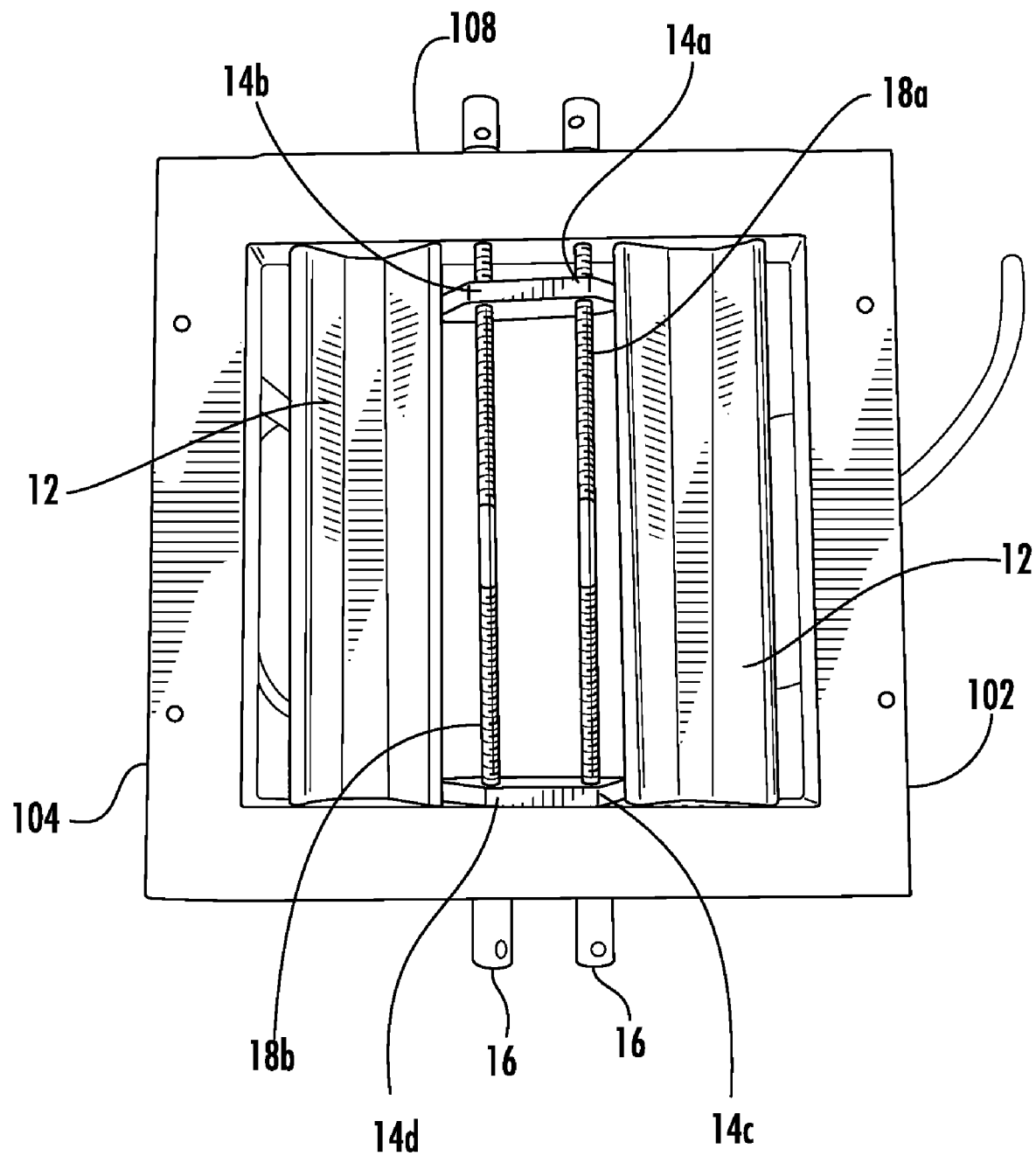
Figure 12:
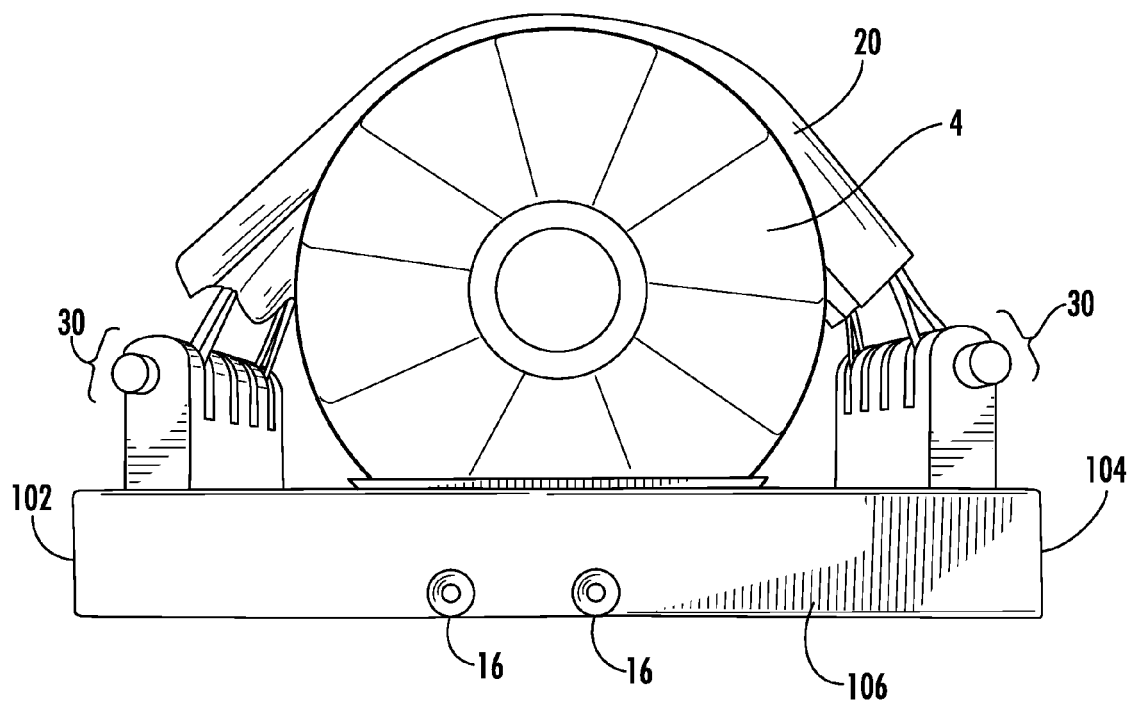
Figure 13:
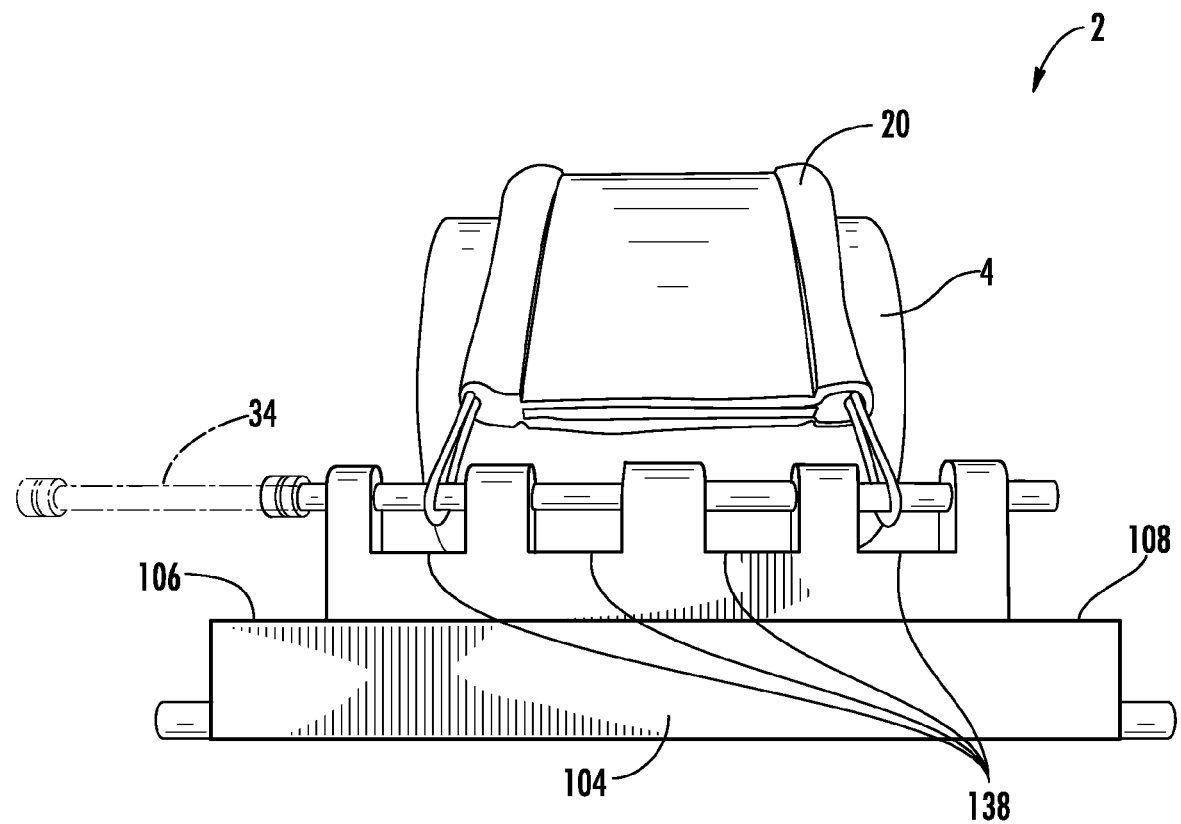
Figure 14:
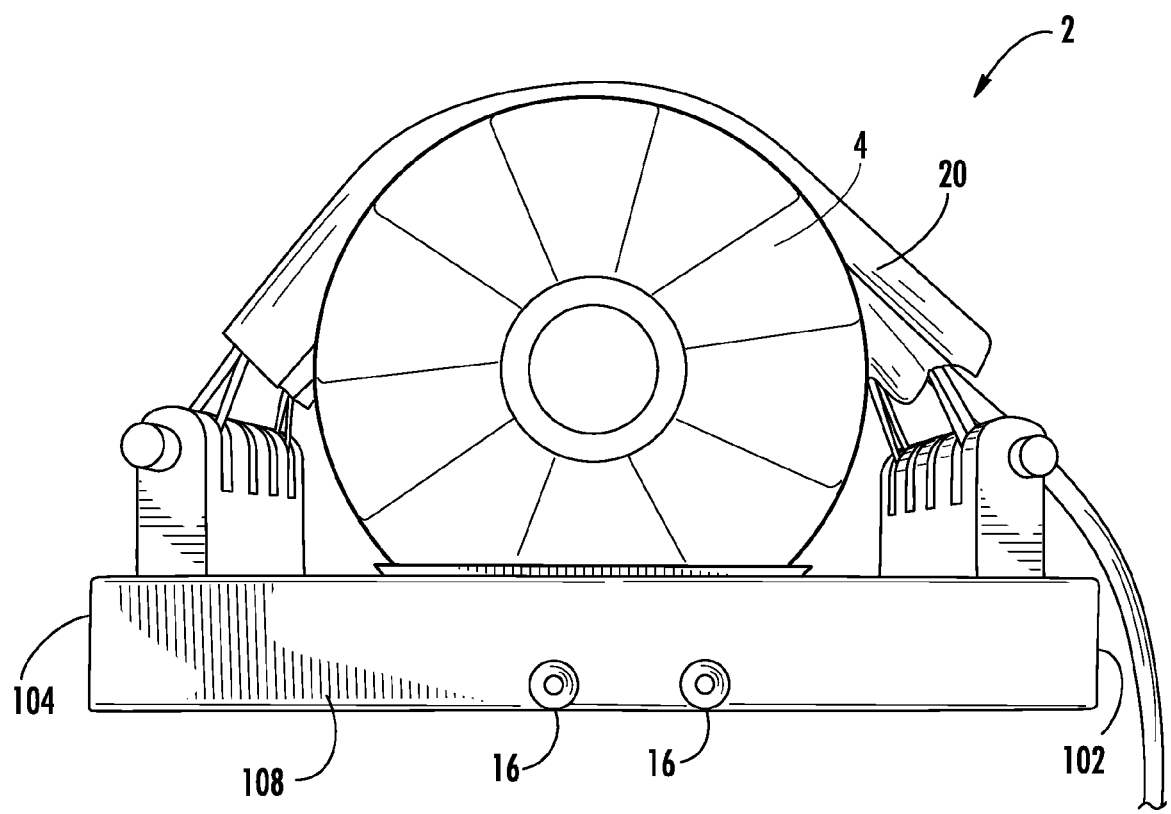
Figure 15:
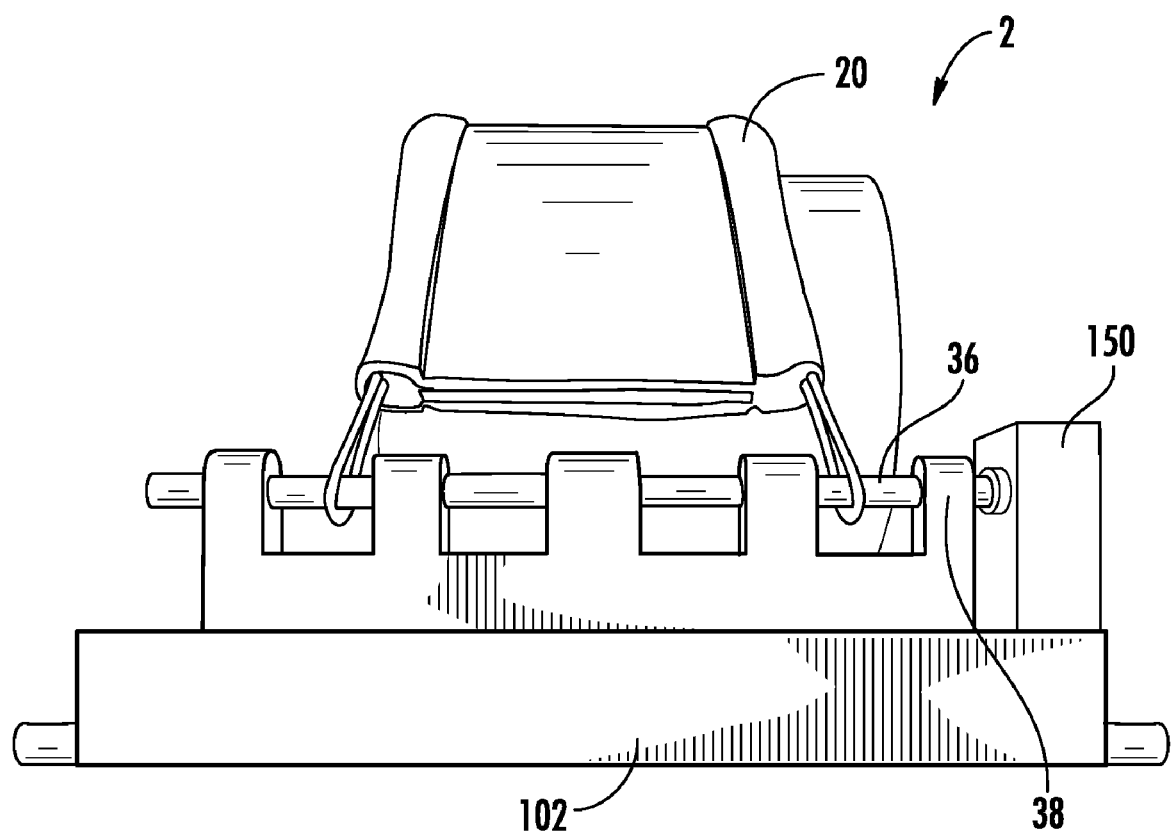
Figure 16A:
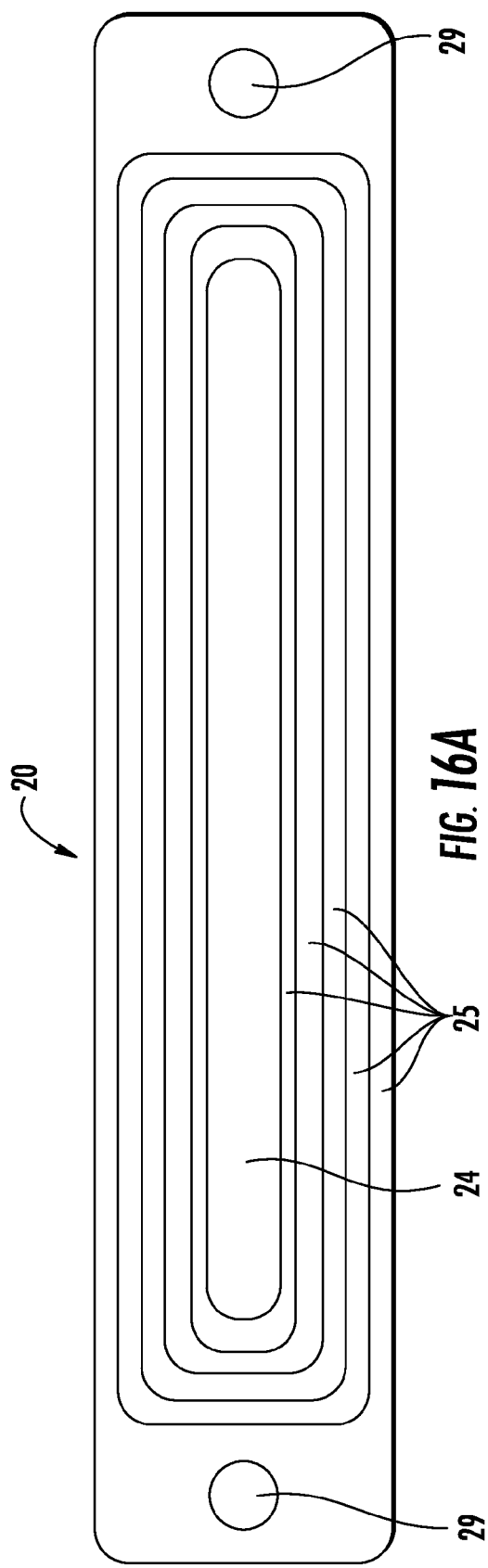
Figure 16B:
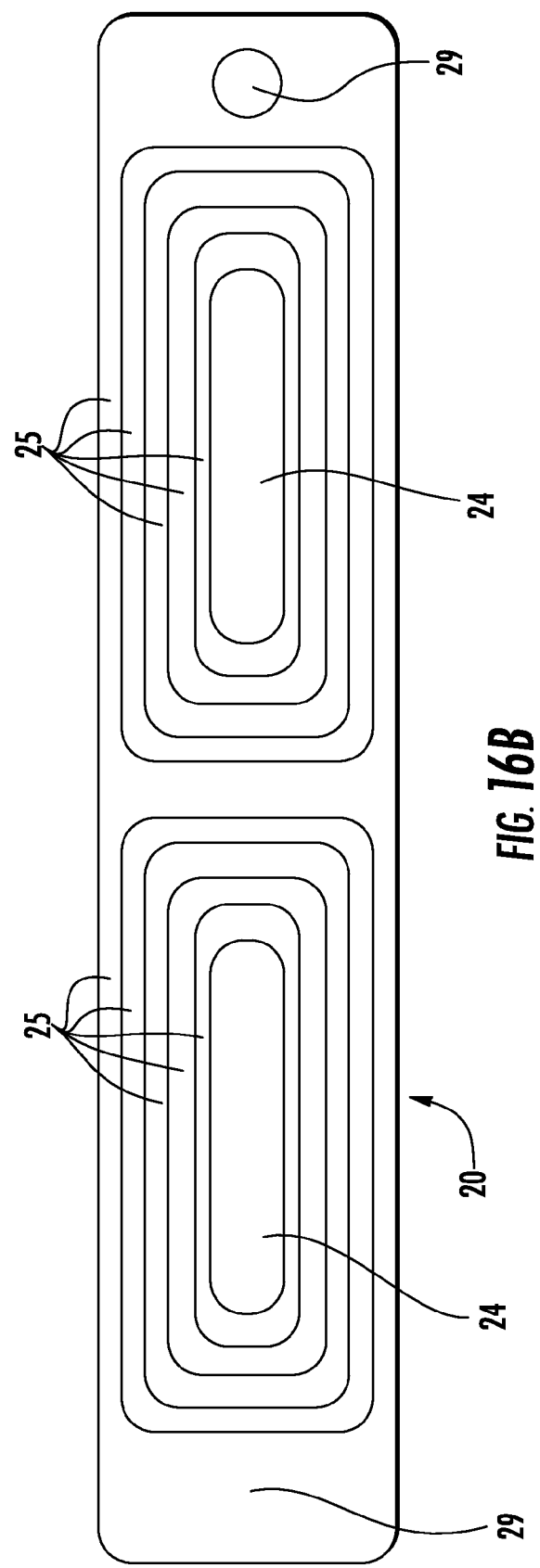
Figure 17:
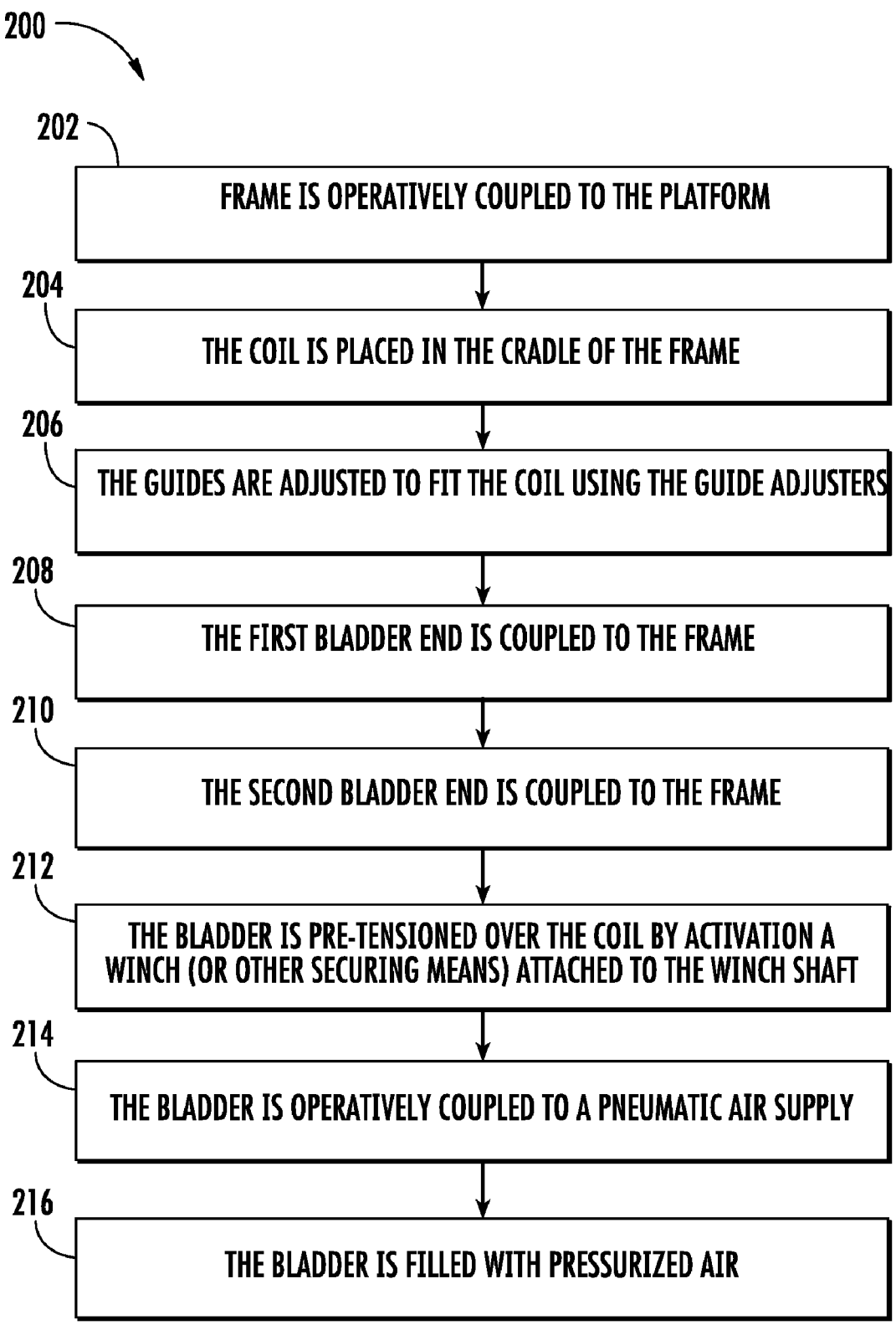

FIG. 6 provides a perspective view illustrating a coil support system with a frame, which is attached to a platform on a tracker-trailer, in accordance with an embodiment of the present invention;

FIG. 7 provides a perspective view illustrating a coil support system with a coil, in accordance with an embodiment of the present invention;

FIG. 8 provides a perspective view illustrating a coil support system, in accordance with an embodiment of the present invention;

FIG. 9 provides a close up perspective view illustrating a coil support system with a coil, in accordance with an embodiment of the present invention;

FIG. 10 provides a plan view illustrating the top of a coil support system, in accordance with one embodiment of the present invention;

FIG. 11 provides a bottom view illustrating the underside a coil support system, in accordance with one embodiment of the present invention;

FIG. 12 provides a first side view illustrating a side of a coil support system, in accordance with one embodiment of the present invention;

FIG. 13 provides a forth side view illustrating a side of a coil support system, in accordance with one embodiment of the present invention;

FIG. 14 provides a second side view illustrating a side of a coil support system, in accordance with one embodiment of the present invention;

FIG. 15 provides a third side view illustrating a side of a coil support system, in accordance with one embodiment of the present invention FIG. 16A provides a cross sectional view of a bladder with a chamber and layers, in accordance with one embodiment of the present invention;

FIG. 16B provides a cross sectional view of a bladder with more than one chamber and layers, in accordance with one embodiment of the present invention; and FIG. 17 provides a process illustrating how to secure a coil to the to the coil support system, in accordance with one embodiment of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

FIG. 1A provides a perspective view illustrating an embodiment of a support system 2, which is used for the transport of loads. The support system 2, as illustrated in FIG. 1A, is generally used to transport one or more coils 4, which are generally made up of coiled metal wire or sheets, but in other embodiment can be coils 4 of any type or material. The support system 2 can be used to transport coils 4 in a number of applications, such as trucks, trains, boats, airplanes, etc. The coils 4 may be of any size, but typically range from forty-eight (48) inches to eighty (80) inches in outer diameter. In some embodiments, the coils 4 are not symmetrically cylindrical, and thus, the diameters are not uniform.

As explained in further detail below, the support system 2 is particularly designed to allow for the secure transport of coils 4 on standard flatbed tractor-trailers with minimum or no modification to the flatbed tractor-trailers currently in use. The configuration of the support system 2 provides the flexibility necessary to transform or remove the support system 2 when hauling a variety of other types of loads on the same flatbed tractor-trailer.

Transporting heavy coils 4 may be a problematic task. When a coil 4 becomes unsecure on a tractor-trailer it can cause issues relative to controlling the tractor-trailer. In some instances, the coil 4 itself can break free of the supports altogether and fall from the truck causing not only damage to the coil but to other property as well. Some inventions try to solve the problem of securing the coils by relying on the tractor-trailer driver's ability to properly secure the coils 4 to the flatbed utilizing chains. Typically, coils 4 are secured with one chain per ten-thousand (10,000) pounds of coil, as required by some state laws. The chains often damage the coils 4 because they apply to much pressure to specific areas of the coils 4, such as the coil eyes 6. Additionally, since the coils 4 have rounded or in some cases a somewhat rounded surface that lies on the flatbed (coils 4 in some instances may rest on a flat support or become flattened on the surface on which it rests because of the large amount of weight that is being supported) it is difficult to equally load the coil 4 properly using the chains. Furthermore, there is no standard recommended procedure for drivers or other personnel to properly secure the coils to the tractor-trailers using chains. Therefore, simply chaining the coils 4 to the flatbed is not the safest way to transport the coils 4, but is accepted due to the relative low cost of using chains. Creating special trailer beds or elaborate shipping containers would not be cost effective to ship the various types and sizes of coils 4 because of the associated costs with retrofitting the trailers or creating specialized shipping containers.

Provided below are descriptions of various aspects of the invention described in terms of securing a steel coil to a flat bed of a tractor-trailer in various combinations. It is understood that the below description is meant to explain the inventions in a particular environment but should not be seen as limiting the scope of the invention. Specifically, the invention is not limited to embodiments involving securing of a coil or cylinder but can used to secure a load of any physical shape. Indeed, the disclosed invention is well suited for securing loads of an odd shape, given that the bladder 20 may conform to various shapes. Further, the invention is not limited to securing a load to a tractor-trailer. It is understood that the described system and process may be used to secure a load to any platform or transportation system.

The present invention provides systems and processes for securing a load, such as a coil 4, to a platform 8. The system of one embodiment is designed as a simple, flexible, and cost effective alternative to securing coils 4 with chains or other means. In one embodiment, the present invention secures the coils 4 through the use of a support system 2 that is attached to the flatbed tractor-trailer and supports the rounded coils from the bottom and sides where necessary, and secures the top of the coils 4 through the use of a bladder 20 that is filled with pressurized air from the tractor-trailer's breaking system. In one embodiment, the present invention allows the tractor-trailer company to utilize the tractor-trailer's own air systems (which are necessary to operate the breaks of the tractor trailer) to safely transport coils quickly and at an affordable price. The support system 2 results in increased safety and reduction in time and cost associated with securing the coils 4. These factors result in reductions in insurance costs, saving the manufactures, suppliers, distributors, and purchasers of the coils 4, as well as the transporters money. The present invention also does not damage the coils 4 and coil eyes 6 and offers protection from the elements because the coils 4 are secured and covered with an air filled bladder 20 instead of chains or the like. A further benefit of the support system 2 is that it can be easily removed or moved along the body of the flatbed and stored should the tractor-trailer's subsequent loads not be coils 4.

Generally, as illustrated in FIG. 1A, the system 2 comprises a bladder 20 for securing a load, such as a coil 4, to a platform 8. In one embodiment, the bladder 20 may be directly connected to the platform 8 via securing means 30, such as a coupling or the like. The securing means could be cables 26 or straps connected to the bladder 20. The securing means 30 could include loops or hooks for connecting directly to pins or detents in a platform 8. In other embodiments the securing means 30 is a cargo control strap (or other cable), which is secured to the platform 8 using winches or ratchet tie-downs. The load is placed between the bladder 20 and the platform 8, and is tensioned by the securing means 30. When the bladder is pressurized, the load is secured against the platform 8. The platform 8 is illustrated in FIG. 1A as a truck platform 8; however, in other embodiments of the invention the platform 8 could be any type of platform on any type transportation system.

In some embodiments, as illustrated in FIGS. 1A through 5, the support system 2 includes a frame 10, which is the same as the platform 8 in the illustrated embodiment, a cradle 12 comprising guides 14, guide adjusters 16, adjustment bars 18, and securing means 30. FIG. 2 illustrates a front view of a coil supported in a cradle 12 on a frame 10 (or platform 8 in this embodiment) of a tractor-trailer. As illustrated in FIG. 2, in one embodiment the cradle 12 is placed on the frame 10 and supports the coil 4 so the coil 4 cannot move laterally or axially on the frame 10. The coil 4 is secured to the frame 10 through a securing means 30, such as a strap and winch, as illustrated in FIGS. 1B and 2. The strap is tensioned using a winch, ratchet system, or the like to secure the coil 4 to the frame 10. In some embodiments the winch or ratchet system may be a part of the cables 26. In some embodiments the bladder 20 is filled with air through an inflation input, such as an inflation tube 28, using a pressurized air system, as illustrated in FIG. 1A, in order to provide additional securing force to the coil 4. The inflation tube 28 can be connected to the break system directly or through a pressure line through the use of a connector, such as but not limited to a quick connect connector. In some embodiments of the invention, the cradle 12 not only rests on the frame 10, but also is also operatively coupled to the frame 10 through a connection means, such as but not limited to being bolted, strapped, chained, welded, etc.

As illustrated in FIG. 3 the cradle 12, in one embodiment, comprises guides 14 that are operatively coupled to each other. In one embodiment the first guide 14a and second guide 14b have one or more slots that allow one or more protrusions on the third guide 14c and forth guide 14d to slide along the first guide 14a and second guide 14b. In other embodiments of the invention the guides 14 are operatively coupled to each other in other ways to allow the guides 14 to move with respect to each other.

More specifically, as shown in FIG. 3, the adjustment bars 18 are threaded rods. The third and forth guides 14c, 14d are configured to actively operate with one adjustment bar 18 and passively operate with the other adjustment bar 18. For example, as illustrated in FIG. 3, third guide 14c includes two through holes 15a and 15b. Through hole 15a is threaded so as to interact with the threads of adjustment bar 18c. Through hole 15b is unthreaded such that it may slide relative to adjustment bar 18d. Oppositely, forth guide 14d has two through holes 15c and 15d. Through hole 15d is threaded so as to interact with the threads of adjustment bar 18d, and through hole 15c is unthreaded such that it may slide relative to adjustment bar 18c. In this configuration, when adjustment bar 18c is rotated, third guide 14c is moved along the adjustment bars 18c and 18d due to the interaction of the threads of through hole 15a relative to the threads of adjustment bar 18c. Movement of guide 14c is not affected by the threads of adjustment bar 18d due to the fact that through hole 15b is not threaded. Similarly, when adjustment bar 18d is rotated, guide 14d is moved axially along the adjustment bars 18c and 18d due to the interaction of the threads of through hole 15d relative to the threads of adjustment bar 18d. Movement of guide 14d is not affected by the threads of adjustment bar 18c due to the fact that through hole 15c is not threaded. The guides 14c and 14d can be adjusted to fit loads, such as coils 4, which vary in size without having to use various cradles 12 of different sizes.

FIG. 4 provides a bottom view of the cradle with adjustable guides 14a, 14b, 14c, 14d, and FIG. 5 provides a side view of the cradle with adjustable guides 14a, 14b, 14c. As illustrated in FIG. 4 the cradle 12, in one embodiment, comprises guides 14 that are operatively coupled to each other. In the embodiment illustrated in FIGS. 4 and 5, the guides 14 are operatively coupled to allow movement with respect to each other. The first and second guides 14a, 14b have one or more oversized slots 11a, which allow one or more protrusions 11b on the third and forth guides 14c, 14d to slide along the first and second guides 14a, 14b laterally, as well as vertically, when the first and second guides 14a, 14b are move relative to each other, as illustrated in FIG. 5.

More specifically, as shown in FIG. 4, the third and forth guides 14c, 14d move as previously described with respect to FIG. 3. Similarly, the first and second guides 14a, 14b are configured to actively operate with one adjustment bar 18 and passively operate with another adjustment bar 18. For example, as illustrated in FIG. 4, first guide 14a includes two through holes 17a and 17b. Through hole 17a is threaded so as to interact with the threads of adjustment bar 18a. Through hole 17b is unthreaded such that it may slide relative to adjustment bar 18b. Oppositely, second guide 14b has two through holes 17c and 17d. Through hole 17d is threaded so as to interact with the threads of adjustment bar 18b, and through hole 17c is unthreaded such that it may slide relative to adjustment bar 18a. In this configuration, when adjustment bar 18a is rotated, first guide 14a is moved laterally along the adjustment bars 18c and 18d due to the interaction of the threads of through hole 17a relative to the threads of adjustment bar 18a. Movement of first guide 14a is not affected by the threads of adjustment bar 18b due to the fact that through hole 17b is not threaded. Similarly, when adjustment bar 18b is rotated, second guide 14b is moved along the adjustment bars 18b, 18a due to the interaction of the threads of through hole 17d relative to the threads of adjustment bar 18b. Movement of second guide 14b is not affected by the threads of adjustment bar 18a due to the fact that through hole 17c is not threaded. Furthermore, when the first and second guides 14a and 14b are moved relative to each other, by rotating the guide adjusters 16 of adjustment bars 18b, 18a, the third and forth guides 14c, 14d move vertically in the oversized slots 11a, as illustrated in FIG. 5. The guides 14 can be adjusted to fit loads, such as coils 4, which vary in size, without having to use various cradles 12 of different sizes. In other embodiments of the invention, the guides 14 are operatively coupled to each other in other ways to allow the guides 14 to move with respect to each other.

In one embodiment of the invention, when the load in the support system 2 is a coil as illustrated in FIG. 1A, the coil can be said to have an axial axis along the center line of the coil eye 6. In the illustrated embodiment, the coil 4 can be secured by moving the first and second guides 14a, 14b laterally to support the sides of the coil 4, through the use of the guide adjustors 16 of adjustment bars 18a, 18b. Alternatively, the coil 4 can be secured axially by moving the third and forth guides 14c, 14d to support the sides of the coil 4.

FIG. 6 illustrates one embodiment of a coil support system 2 and transport system with a coil installed. The support system 2, as illustrated, has a built in frame 10 that is attached to a platform 8 on a tracker-trailer. In this embodiment the frame 10 and platform 8 are not one in the same, as was the case with other embodiments. In this embodiment the frame 10 can be used to operatively couple the cradle 12 to various types of platforms 8 used on various transportation systems, as well as secure the coil 4 to the frame 10 and cradle 12 directly, and thus the platform 8 indirectly. The types of transport systems include but are not limited to, trucks, boats, trains, airplane cargo areas, or even building floors, etc. In one embodiment the frame 10 is secured to the platform 8 through the use of a connection means, such as but not limited to bolted, strapped, chained, welded, etc.

More specifically, various embodiments of the support system 2 with a frame 10 are further illustrated in FIGS. 7 through 15. The support system 2 includes a frame 10 that is operatively coupled to the cradle 12, guides 14, guide adjustors 16, adjustment bars 18, and securing means 30. The securing means 30 in one embodiment are in the form of shackles 32, a pin shaft 34, a winch shaft 36, and shaft supports 38. The frame 10, as illustrated in FIGS. 8 and 11, in some embodiments, is made up of two structural end frame supports 106, 108 (configured as first and second spaced apart opposed sides) and two structural side frame supports 102, 104 (configured as third and fourth space apart opposed sides) that are welded together into a square or rectangular shape. In other embodiments of the invention the frame can take a different shape and configuration and comprise of more or less structural supports. In other embodiments of the invention, instead of being welded the supports can be bolted together, form pressed together, casted as an integral piece, etc. The frame 10, in some embodiments, utilizes the standard rails that are on most tractor trailers. The rails are typically welded to the chassis and are capable of withstanding the rigging of loads. The frame 10 is coupled to the flatbed tractor-trailer rails utilizing bolted type fasteners, in essence becoming part of the tractor-trailer flatbed platform 8. In some embodiments the frame 10 is removably coupled to the tractor-trailer rails through other attachment means besides bolts, such as, slotted joints, straps, chains, etc. In other embodiments of the invention the frame 10 can be permanently coupled to the tractor trailer rails, for example by welding or formed integrally in a casting with the rails, to name a couple.

As illustrated in FIGS. 7, 8, and 11, the frame 10 is operatively coupled to the cradle 12. The cradle 12, as previously described, comprises guides 14. In some embodiments, the first and second guides 14a, 14b are two triangularly shaped cradle supports 122, 124, as illustrated in FIG. 8, extending between the two structural end frame supports 106, 108 (configured as first and second spaced apart opposed sides) and located between the two structural side frame supports 102, 104 (configured as third and fourth space apart opposed sides). The cradle supports 122, 124 are spaced apart at a distance to support the coil 4. In other embodiments of the invention the cradle supports 122, 124 can be configured in other shapes that would support the coil 4. The triangularly shaped structures 122, 124 are positioned within the frame 10 at a distance to secure a coil 4 that is in the shape of a cylinder. Still in other embodiments of the invention the cradle supports 122, 124 are removably coupled to, or adjustable within, the end frame supports 106, 108 to allow for the support and transport of coils 4 that vary in size. For example, in some embodiments the cradle supports 122, 124 can be removed from the frame 10 and different sized and/or shaped supports can be replaced within the frame to support coils 4 of different sizes. In other embodiments, the positions where the cradle supports 122, 124 are coupled to the end frame supports 106, 108 can change based on the size and shape of the coils 4 being transported. For example, the cradle supports 122, 124 can slide along a slotted track or rotating drive screw in the end frame supports 106, 108, or be hydraulically or pneumatically adjusted through piston cylinders, to name a few.

As previously described with respect to FIGS. 3, 4, and 5 the side guides 14 are used to secure the coils 4 when they are positioned in the cradle 12 and inhibit any movement that the coil would have when being transported, especially on cornering or heavy braking. Depending on the orientation of the coils 4 on a tractor-trailer, or other platform 8, the centrifugal forces on the coils 4 are high during transport, such as during either cornering or heaving breaking by a tractor-trailer. The cradle 12 and guides 14 locate the coils 4 and support it to stop any movement during maneuvering of the tractor-trailer. In some embodiments of the invention the side guides 14 are capable of accommodating any length of coils 4 up to eighty (80) inches, and in some embodiments lengths of coils 4 greater than eighty (80) inches. In one embodiment, the guide adjustors 16 are rotated, and thus turn the adjustment bars 18, which move the guides 14 to clamp the coil sides, such as coil ends 142, as illustrated in FIG. 9.

In some embodiments of the invention, one opposing guide 14, such as the first or third guides 14a, 14c, may be stationary and operatively coupled, either removably or permanently to the frame 10. In this embodiment the second or forth guides 14b, 14d would be adjustable through the use of the adjustment bars 18 and guide adjustors 16. In other embodiments of the invention there may only be one adjustment bar 18 or guide adjustor 16. Still in other embodiments of the invention one or more guides 14 may be secured to the frame 10 or cradle 12 and movable, in a number of different ways other than through the use of the adjustment bars 18. For example, in some embodiment of the invention the guides 14 are secured directly to the frame 10 or cradle 12 through the use of bolts or other attachment means. Various coupling points on the frame 10 or cradle 12 could be used to attach the side guides 14 in various locations on the frame 10 or cradle 12 to support different sized coils 4. In still other embodiments of the invention, the guides 14 could be secured through the use of gears, such as a gear rack or the like.

The support system 2 also has a specially made bladder 20 (i.e. tarpaulin) that is used to secure the coils 4 after they are placed on the cradle 12 and/or frame 10. The bladder 20, in some embodiments, as illustrated in FIGS. 7 through 15, is made of a cover 22, an air tight chamber 24, cables 26, and an inflation tube 28. The cover 22 encases the air tight chamber 24 and is made from fibers that are typically used in lifting or securing equipment, such as canvas, rubber, nylon, plastic, composite, or other types of materials. In other embodiments the cover 22 may only partially encase the air tight chamber 24. The cover 22 may be formed integrally with the chamber 24, or in some embodiments the cover 22 may not be necessary at all, and the bladder 20 may only comprise of the chamber 24 itself. The bladder 20, in some embodiments, is made of one or more layers 25 of a flexible material that can be pressurized. In some embodiments of the invention, the bladder 20 is pressurized up to 125 psi or more (note 1.25 psi equates to approximately 1 ton of holding force). As illustrated in FIGS. 16A and 16B, in some embodiments, the bladder 20 is made up of multiple layers 25 and/or chambers 24. One or more of the layers 25 and/or chambers 24 can be pressurized. In some embodiments, the layers 25 and/or chambers 24 are made of different colors or textures. In this way if the bladder 20 is damaged or cut a person can determine, based on the color or texture of the layer exposed, the extent of the damage and whether or not the bladder 20 can still be used in normal operation or if it needs to be repaired.

The bladder 20 or cover 22 is operatively coupled to securing means 30 on the frame through attachment means, such as cables 26, straps, or the like, which are used to secure the bladder 20 to the frame 10, as discussed in further detail below. The cables 26 can be various types of cable, such as chains, rope, or the like, and be made from any type of material, such as steel, nylon, etc. In some embodiments the cables 26 are operatively secured directly to the chamber 24 instead of the cover 22. In some embodiments of the invention, as illustrated in FIG. 16, the bladder 20 has channels 29, running along the entire or a portion of the length of the bladder 20, such as in the cover 22 or other area. The channels can house the cables 26 or other attachment means, which are used to attach to the frame 10.

The bladder 20 is operatively coupled to an inflator tube 28. The inflator tube 28 is made to be operatively coupled to an air supply, which inflates the bladder 24 in order to secure the coil 4 to the support system 2, as explained in greater detail below. In some embodiments of the invention, the inflator tube 28 and bladder 20 can be either a pneumatic device that is filled with air or some other type of gas, or in other embodiments it is a hydraulic device that is filled with a type of liquid fluid. In some embodiments of the invention the bladder 20 covers the entire length of the coils 4 to protect it from the elements. In other embodiments of the invention the bladder 20, and thus the chamber 24, only cover a portion of the length of the coils 4. In still other embodiments of the invention, the bladder 20 will only cover a portion of the length of the coils 4, but the bladder 20 will have additional sections or flaps that protect the rest of the coils 4 from the elements. The flaps are attached to an edge or edges 122 of the bladder and hang over the coil ends 142 of the coils 4. In some embodiments additional flaps are attached to the bladder 20 and hang over the wound surface 144 of the coils 4. The flaps can be made of the same or different material as the cover 22 or bladder 20, such as canvas, rubber, nylon, plastic, composite, etc.

The bladder 20 is secured to the frame 10 through the securing means 30. In some embodiments of the invention, the securing means 30 is in the form of shaft supports 38 that are coupled to the side frame supports 102, 104. In some embodiments of the invention, the side frame supports 102, 104 are permanently coupled to the shaft supports 38 through a weld joint, or formed integrally through a casting, or other permanent configuration. In other embodiments of the invention the shaft supports 38 are removably coupled to the side frame supports 102, 104 through bolts or other like removable coupling mechanism. Shackles 32 are operatively coupled to the cables 26, or other attachment means, on the bladder 20. In other embodiments of the invention the shackles 32 can be integral with the cables 26. The shackles 32 on the first bladder end 126 of the bladder 20 are coupled to the shaft support 38 through the use of the pin shaft 34. The pin shaft 34 is inserted into one of the shaft supports 38 through pin holes 40, as illustrated in FIG. 8. Notches 138 are provided in the shaft supports 38 for passing the pin shaft 34 through the shackles 32. In other embodiments, the first bladder end 126 of the bladder 20 is coupled to the frame 10 or the shaft supports 38 in any number of other ways, such as but not limited to hooks, locks, clamps, clips, etc. For example, the pin shaft 34 can be secured directly through loops in the cover 22 or the bladder 20. Still in other embodiments, the pin shaft 34 is not necessary, and the bladder cables 26 are secured directly to the shaft support 38 through a permanent shaft in the shaft support 38, through apertures formed in the shaft support 38, directly to the frame 10, etc.

The shackles 32 on the second bladder end 128 of the bladder 20 are operatively coupled to a winch shaft 36, or ratchet-tie, that is operatively coupled to the other shaft support 38. In other embodiments of the invention cables 26 can be directly coupled to the winch shaft 38 without the use of the shackles 32. Still in other embodiments of the invention the winch shaft 36 is not necessary, and the cables 26, or the cover 22 or bladder 20, of the second bladder end 128 are attached directly to the shaft support 38 or frame 10 as previously discussed with respect to the first bladder end 126 of the bladder 20.

The total weight of the support system 2, in some embodiments, should be kept to a minimum because any additional weight added to the tractor-trailer will reduce the overall load capacity of the tractor-trailer, or other transport system. In some embodiments, the system 2 will weigh less than two-thousand (2000) pounds. However, in other embodiments, the system 2 may weigh more than two-thousand (2000) pounds. An approximate weight of two-thousand (2000) pounds will allow for approximately a fifty-seven thousand (57,000) to fifty-eight thousand (58,000) pound payload for a typical tractor-trailer. However, in other embodiments of the invention the tractor trailer may have a smaller or larger payload than described. In other embodiments of the invention, one or more support systems 2 can be coupled to the platform 8 of the tractor-trailer in order to transport one or more coils 4. Still in other embodiments of the invention one or more coils 4 can be secured on one support system 2 depending on the size of the coils 4 and the support system 2, itself.

FIG. 17 provides a coil securing process 200, which illustrates a process for securing a coil 4 in the support system 2. As illustrated in block 202 of FIG. 17 the frame 10 of the system 2 is first secured to the platform 8, such as the flatbed of a tractor-trailer. Typically, the frame 10 is operatively coupled to the tractor-trailer rails prior to leaving the depot, but it can be operatively coupled to the rails in any location. As previously discussed the frame 10 is secured to the platform 8 through bolts or other like means. In some embodiments, the support system 2 is secured to the tractor-trailer in a way that allows the coils 4 to sit parallel to the tractor trailer body (i.e. shotgun) or at right angles to the tractor trailer body (i.e. suicide).

As illustrated in block 204 the coil 4 is placed in the cradle 12 of the frame 10. Coils 4 can weigh approximately between one-thousand (1,000) to one-hundred thousand (100,000) pounds or more, so the coil 4 is placed in the cradle 12 through the use of a crane, forklift, or other like means. As previously stated loads over sixty-thousand (60,000) pounds are not typically transported on a tractor-trailer. However, the support system 2, in some embodiments can be used with other transport system to support coils 4 that weigh the less than, the same as, or more than coils 4 that are transported with tractor-trailers. As illustrated by block 206 the guides 14 are adjusted to fit the coil 4 using the guide adjusters 16. In some embodiments of the invention, the user will adjust the cradle 12, such as the first and second guides 14a, 14b, depending on the size of the coil 4 that is being placed in the cradle 12. In some embodiments of the invention the user will adjust the third and forth guides 14c, 14d, to fit the coil 4. In one embodiment, the user will turn the guide adjusters 16 in one direction, which in turn rotates the adjustment bars 18 that are threaded for sliding the guides 14c, 14d into position next to the coil ends 142, as illustrated in FIG. 9. When the tractor-trailer reaches the delivery destination, a user will rotate the side guide adjusters 16 in the opposite direction to remove the guides 14 from the secured position next to the coil ends 142.

As illustrated by block 208 in FIG. 11, the first bladder end 126 of the bladder 20 is secured to one side of the frame 10. In one embodiment, the first bladder end 126 is secured by sliding the pin shaft 34 through one of the shaft supports 38 and the shackles 32 that are coupled to the first bladder end 126 of the bladder 20. As illustrated by block 210, the second bladder end 128 is coupled to the opposite side of the frame 10. In one embodiment, the second bladder end 128 is secured to a winch shaft 36 that is coupled to the other shaft support 38, directly by the cables 26 or indirectly through shackles 32. In some embodiments, the cables 26 or shackles 32 are thread through apertures in the winch shaft 36.

Thereafter, as illustrated by block 212, the bladder 20 is then pre-tensioned over the wound surface 144 of the coil 4. In one embodiment the bladder 20 is pre-tensioned by activating the winch shaft 36. The winch shaft 36 is typically activated through manual means by rotating the winch shaft with a bar manually. The winch shaft 36 includes a gear system as conventionally known for holding the winch shaft at a rotational position as it has been rotated in a ratchet type configuration. In some embodiments, as illustrated in FIG. 15 the winch shaft is connected to a winch motor 150, for automatically pre-tensioning the bladder. The winch motor 150 rotates the winch shaft 36, which winds the cables 26 around the winch shaft 36, resulting in a tensioned bladder 20 that secures the coil 4 within the support system 2. In other embodiments both the first bladder end 126 and the second bladder end 128 can be secured to the shaft supports 38 as previously described for the first bladder end 126 or the second bladder end 128 individually, or to the frame 10 or platform 8. Thereafter, the bladder 20 can be pre-tensioned to secure the coil 4 within the support system 2 through any number of securing means.

As illustrated by block 214 in FIG. 17 the inflation tube 28 on the bladder 20 is coupled to an air supply, such as the tractor-trailers' bleed air for the breaks. The air supply is used to inflate the chamber 24 of the bladder 20 with a gas, which in some embodiments is air, as illustrated by block 216 in FIG. 17. In some embodiments of the invention, the bladder 20 is inflated to 125 psi. Most compressors on tractor-trailers that are used in the breaking system are typically capable of producing around 125 psi. However, in some embodiments of the present invention, the bladder 20 is inflated to ninety (90) psi, which provides an estimated one-hundred ten (110) tons of clamping force to the coil 4 in the frame 10. Therefore, most tractor-trailers will have the capacity to inflate the chamber 24 of the bladder 20 to an acceptable level in order to provide enough clamping force to the coils 4 for securing the load during transport. The one-hundred ten (110) tons of clamping force provides and estimated four to one safety factor, which is much greater then presently supplied through the use of chains. Using the air supply on the tractor-trailer for the breaks, the pressurize bladder 20 has a continuous flow of pressurized air. Without the air supply the tractor-trailer's brakes are locked in the breaking position, and the tractor-trailer cannot move. Therefore, if an incident occurs where the air systems of the tractor-trailer fail and the bladder 20 begins to deflate, the tractor-trailer's brakes would lock as well, thus preventing the tractor-trailer from moving with an unsecured coil 4.

In some embodiments the bladder 20 has air supply and check valves, that provide a "low pressure warning" when the bladder 20 begins to lose pressure, in order to alert the driver of the tractor-trailer that the pressure required to secure the coil 4 using the bladder 20 is low, and an issue may exist.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for securing a coil of material comprising:
   a cradle structure for abutting the coil, wherein the cradle structure comprises first and second guides extending in a first direction and spaced apart from each other at a distance to abut opposed sides of the coil, wherein at least one of the first and second guides of said cradle structure is adjustable relative to the other guide to adjust the space between the guides, wherein the cradle structure further comprises third and fourth guides extending in a second direction and spaced apart from each other at a distance to abut opposed sides of the coil, and wherein at least one of the third and fourth guides of said cradle structure is adjustable relative to the other guide to adjust the space between the guides;
   a frame; and
   a bladder adapted for coupling to said frame in a spaced apart position from said cradle structure and partially surrounding the coil, wherein said bladder defines at least one chamber for receiving a gas, such that when said bladder is in a pressurized state, said bladder is capable of securing the coil between said bladder and the cradle structure.

2. The system of claim 1, wherein said bladder further comprises a pneumatic inflation input operatively coupled to the at least one chamber of said bladder, wherein the pneumatic inflation input is adapted for coupling to a source of pressurized gas for filling the at least one chamber of said bladder with gas to thereby inflate said bladder.

3. The system of claim 2, wherein the pneumatic inflation input of said bladder is adapted for connection to an air brake system of a transportation vehicle for inflation of said bladder.

4. The system of claim 1, wherein said frame is one of a trailer platform, a train car platform, an aircraft platform, a platform on a ship, a platform of a building.

5. The system of claim 1, wherein said cradle structure is integral with said frame.

6. The system of claim 1 further comprising connectors associated with said frame for attaching said bladder to said frame, wherein one of the connectors comprises a winch.

7. The system of claim 1, wherein at least one of the first and second guides of said cradle structure is contoured or beveled to abut a curved surface of the coil.

8. The system of claim 1, wherein said frame comprises first and second spaced apart opposed sides connected to third and fourth space apart opposed sides, wherein said cradle structure is located within said frame and comprises first and second guides extending between the first and second sides of said frame and located between the third and fourth sides of said frame, said guides further spaced apart at a distance to support the coil.

9. The system of claim 8, wherein said first and second guides are adjustable relative to each other to conform to a dimension of the coil.

10. The system of claim 1, wherein said frame comprises first and second spaced apart opposed sides connected to third and fourth space apart opposed sides, wherein said cradle structure comprises third and fourth guides extending between the third and fourth sides of said frame and located between the first and second sides of said frame, said guides further spaced apart at a distance to support the coil.

11. The system of claim 10, wherein said third and fourth guides are adjustable relative to each other to conform to a dimension of the coil.

12. The system of claim 1, wherein said frame comprises first and second spaced apart, opposed sides connected to third and fourth space apart opposed sides; and wherein the first and second guides of the cradle extends between the first and second sides of said frame and are located between the third and fourth sides of said frame, wherein said first and second guides are adjustable relative to each other to conform to a dimension of the coil; and third and fourth guides extending between the third and fourth sides of said frame and located between the first and second sides of said frame, wherein said third and fourth guides are adjustable relative to each other to conform to a dimension of the coil.

13. The system of claim 1, wherein said bladder comprises first and second spaced apart bladder sides, and wherein said frame further comprises first and second couplings positioned at respective opposed sides of the said frame to thereby secure said bladder to said frame.

14. The system of claim 1, wherein said bladder comprises at least one channel extending between first and second bladder ends, wherein said channel is adapted for receiving at least one cable for securing said bladder to couplings of said frame.

15. The system of claim 1, wherein the at least one chamber comprises two or more layers, wherein at least one of the two or more layers can be pressurized.

16. A system for securing a load comprising:
a cradle structure for abutting the load;
a frame; and
a bladder adapted for coupling to said frame in a spaced apart position from said cradle structure and partially surrounding the load, wherein said bladder defines at least one chamber for receiving a gas, such that when said bladder is in a pressurized state, said bladder is capable of securing the load between said bladder and the cradle structure, and wherein said bladder further comprises a pneumatic inflation input operatively coupled to the at least one chamber of said bladder, wherein the pneumatic inflation input is adapted for coupling to an air brake system of a transportation vehicle for inflation of said bladder.

17. The system of claim 16, wherein said frame is one of a trailer platform, a train car platform, an aircraft platform, a platform on a ship, a platform of a building.

18. The system of claim 16, wherein said cradle structure is integral with said frame.

19. The system of claim 16 further comprising connectors associated with said frame for attaching said bladder to said frame, wherein one of the connectors comprises a winch.

20. The system of claim 16, wherein said cradle structure comprises first and second guides extending in a first direction and spaced apart from each other at a distance to abut opposed sides of the load.

21. The system of claim 20, wherein at least one of the first and second guides of said cradle structure is contoured or beveled to abut a curved surface of the load.

22. The system of claim 20, wherein at least one of the first and second guides of said cradle structure is adjustable relative to the other guide to adjust the space between the guides.

23. The system of claim 16, wherein said cradle structure further comprises third and fourth guides extending in a second direction and spaced apart from each other at a distance to abut opposed sides of the load.

24. The system of claim 23, wherein at least one of the third and fourth guides of said cradle structure is adjustable relative to the other guide to adjust the space between the guides.

25. The system of claim 16, wherein said frame comprises first and second spaced apart opposed sides connected to third and fourth space apart opposed sides, wherein said cradle structure is located within said frame and comprises first and second guides extending between the first and second sides of said frame and located between the third and fourth sides of said frame, said guides further spaced apart at a distance to support the load.

26. The system of claim 25, wherein said first and second guides are adjustable relative to each other to conform to a dimension of the load.

27. The system of claim 16, wherein said frame comprises first and second spaced apart opposed sides connected to third and fourth space apart opposed sides, wherein said cradle structure comprises third and fourth guides extending between the third and fourth sides of said frame and located between the first and second sides of said frame, said guides further spaced apart at a distance to support the load.

28. The system of claim 27, wherein said third and fourth guides are adjustable relative to each other to conform to a dimension of the load.

29. The system of claim 16, wherein said frame comprises first and second spaced apart, opposed sides connected to third and fourth space apart opposed sides; and wherein said cradle structure comprises: first and second guides extending between the first and second sides of said frame and located between the third and fourth sides of said frame, wherein said first and second guides are adjustable relative to each other to conform to a dimension of the load; and third and fourth guides extending between the third and fourth sides of said frame and located between the first and second sides of said frame, wherein said third and fourth guides are adjustable relative to each other to conform to a dimension of the load.

30. The system of claim 16, wherein said bladder comprises first and second spaced apart bladder sides, and wherein said frame further comprises first and second couplings positioned at respective opposed sides of the said frame to thereby secure said bladder to said frame.

31. The system of claim 16, wherein said bladder comprises at least one channel extending between first and second bladder ends, wherein said channel is adapted for receiving at least one cable for securing said bladder to couplings of said frame.

32. The system of claim 16, wherein said bladder chamber comprises two or more layers, wherein at least one of the two or more layers can be pressurized.

33. A system for securing a load of material comprising:
- a cradle structure for abutting the load, wherein the cradle structure comprises first and second guides extending in a first direction and spaced apart from each other at a distance to abut opposed sides of the load, wherein at least one of the first and second guides of said cradle structure is adjustable relative to the other guide to adjust the space between the guides, wherein the cradle structure further comprises third and fourth guides extending in a second direction and spaced apart from each other at a distance to abut opposed sides of the coil, and wherein at least one of the third and fourth guides of said cradle is adjustable relative to the other guide to adjust the space between the guides;
- a frame; and
- a bladder adapted for coupling to said frame in a spaced apart position from said cradle structure and partially surrounding the load, wherein said bladder defines at least one chamber for receiving a gas, such that when said bladder is in a pressurized state, said bladder is capable of securing the load between said bladder and the cradle structure, and wherein said bladder further comprises a pneumatic inflation input operatively coupled to the at least one chamber of said bladder, wherein the pneumatic inflation input is adapted for coupling to an air brake system of a transportation vehicle for inflation of said bladder.

\* \* \* \* \*